(12) United States Patent
Hung

(10) Patent No.: US 8,356,292 B2
(45) Date of Patent: Jan. 15, 2013

(54) METHOD FOR UPDATING CONTROL PROGRAM OF PHYSICAL STORAGE DEVICE IN STORAGE VIRTUALIZATION SYSTEM AND STORAGE VIRTUALIZATION CONTROLLER AND SYSTEM THEREOF

(75) Inventor: Ching-Hai Hung, Yonghe (TW)

(73) Assignee: Infortrend Technology, Inc., Chung-Ho, Taipei Hsien (TW)

( * ) Notice: Subject to any disclaimer, the term of this patent is extended or adjusted under 35 U.S.C. 154(b) by 888 days.

(21) Appl. No.: 12/482,774

(22) Filed: Jun. 11, 2009

(65) Prior Publication Data

US 2009/0313617 A1 Dec. 17, 2009

Related U.S. Application Data

(60) Provisional application No. 61/061,109, filed on Jun. 12, 2008.

(51) Int. Cl.
    *G06F 9/45* (2006.01)
(52) U.S. Cl. ........................................... 717/168
(58) Field of Classification Search .................... 717/168
    See application file for complete search history.

(56) References Cited

U.S. PATENT DOCUMENTS

| | | | |
|---|---|---|---|
| 5,999,908 A * | 12/1999 | Abelow | 705/7.32 |
| 6,728,833 B2 | 4/2004 | Pruett et al. | |
| 6,816,950 B2 | 11/2004 | Nichols | |
| 6,820,211 B2 | 11/2004 | Kalman | |
| 6,907,504 B2 | 6/2005 | Burton et al. | |
| 7,032,218 B2 | 4/2006 | Shirasawa et al. | |
| 7,171,518 B2 | 1/2007 | Nichols et al. | |
| 7,389,379 B1 | 6/2008 | Goel et al. | |
| 2005/0033933 A1 | 2/2005 | Hetrick et al. | |
| 2006/0277328 A1 | 12/2006 | Cherian et al. | |
| 2007/0067563 A1 | 3/2007 | Smith et al. | |
| 2009/0077547 A1 | 3/2009 | Kakinoki | |

* cited by examiner

*Primary Examiner* — John Chavis
(74) *Attorney, Agent, or Firm* — McClure, Qualey & Rodack, LLP

(57) ABSTRACT

Method for updating control program of physical storage devices including the steps of: selecting PSD(s) to be updated with the control program; making the PSD(s) in an off-line state; and updating the control program of the PSD(s), wherein if it needs to issue a write request to the selected PSD(s) before completion of updating the control program, unmodified data segment(s) corresponding to the write request is marked as modified data segment(s). the selected PSD(s) performs partial rebuilding after completion of updating the control program, and if it needs to read out from or write to an unmodified data segment of the selected PSD(s) before completion of the partial rebuilding, a R/W request can be issued to the PSD directly without waiting for completion of the partial rebuilding of the PSD. Multipe parity data chunks can also be provided in the same data stripe in another embodiment.

92 Claims, 10 Drawing Sheets

METHOD FOR UPDATING CONTROL PROGRAM OF PHYSICAL STORAGE DEVICE IN STORAGE VIRTUALIZATION SYSTEM AND STORAGE VIRTUALIZATION CONTROLLER AND SYSTEM THEREOF

RELATED APPLICATIONS

This application claims priority to U.S. Provisional Application Ser. No. 61/061,109, filed Jun. 12, 2008, which is herein incorporated by reference.

BACKGROUND OF THE INVENTION

1. Field of Invention

The present invention relates to a method for updating a control program of at least one physical storage device (PSD) in a storage virtualization system, and more particularly, to a storage virtualization controller and system using the method thereof.

2. Description of Related Art

With regard to the related prior arts, please refer to U.S. Pat. Nos. 7,032,218, 6,907,504, 6,728,833, 6,816,950, 6,820,211 and U.S. Patent Publication No. 2005033933.

It can be known from the above prior arts that: in conventional storage virtualization systems, when updating control programs of hard disk drives (HDDs), the systems will enter degraded mode. Under the degraded mode and without interrupting read/write requests from a host entity, the systems can update control program of only one HDD at one time. However, a storage virtualization system generally has many HDDs. If it needs to update all of the HDDs in the system, the update will consume quite a lot of time and make the system stay in the degraded mode for a long time, which results in poor performance of the overall system and results in increasing the risk of data loss. Further, in some conventional prior arts, all of the data in HDD need to be updated with control program have to be first duplicated to another proxy HDD, and then an updating procedure begins. Upon completion of updating the control program of the HDD, all of the data in the proxy HDD are copied back to the HDD, which is time-consuming and results in poor performance.

Moreover, in the prior arts, when a HDD is being rebuilt after its control program has been updated, the HDD cannot be accessed, which greatly reduces system performance.

Further, during the procedure of updating a control program of a PSD in the conventional storage virtualization systems, if the system merely has single set of parity data for checking user data, when failure of other PSD occurs, a portion of data in the system will be lost and cannot be rebuilt, which causes irrecoverable data damages.

Summarizing from the above, while updating a control program of a PSD, the conventional storage virtualization system has the disadvantages of consuming long time for updating the procedure, of poor performance of overall system, and of high risk of data loss, and during the procedure of updating the control program of PSD, if the system merely has single set of parity data for checking user data, a significant disaster of system data loss will be caused when failure of other PSD occurs.

SUMMARY OF THE INVENTION

An object of the present invention is to provide a method and a system for updating at least one control program of at least one PSD in a storage virtualization system having one or more sets of parity data used for checking user data, thereby promoting the performance of the storage virtualization system. In one embodiment, unmodified data segments can be directly accessed during the period of partial rebuilding after completion of updating the control program.

In one embodiment, a method for updating a control program of a physical storage device (PSD) in a storage virtualization system is provided, the method comprising the steps of: selecting at least one PSD to be updated with a control program thereof; making the selected PSD enter an off-line state; updating the control program of the selected PSD, wherein if it needs to issue a write request to the selected PSD before completion of the control program update, an unmodified data segment corresponding to the write request is marked as a modified data segment; and performing a partial rebuilding on the at least one selected PSD after completion of the control program update, wherein if it needs to read data out from or write data into the unmodified data segment of the selected PSD before completion of the partial rebuilding, a read or write request is issued to the selected PSD directly without waiting for completion of the partial rebuilding of all the modified data segments in the selected PSD.

In another embodiment, a storage virtualization controller for updating a control program of a PSD in a storage virtualization system is provided, the storage virtualization controller comprising: a central processing circuitry (CPC); a host-side IO (input and output) device interconnect controller used to connect the CPC and at least one host entity for receiving an IO request from the at least one host entity; and a device-side IO device interconnect controller used to connect the CPC and a plurality of PSDs for executing IO operations of the PSDs in response to the IO request received from the at least one host entity, wherein at least one data stripe is provided in the PSDs, and at least one parity data chunk is provided in the same data stripe, wherein the CPC updates the control program of the PSDs by the following steps, comprising: selecting at least one PSD to be updated with a control program; making the selected PSD enter an off-line state; updating the control program of the selected PSD, wherein if it needs to issue a write request to the selected PSD before completion of the control program update, an unmodified data segment corresponding to the write request is marked as a modified data segment; and performing a partial rebuilding on the selected PSD, after completion of the control program update, wherein if it needs to read data out from or write data into an unmodified data segment of the selected PSD before completion of the partial rebuilding, a read request or the write request is issued to the selected PSD directly without waiting for completion of the partial rebuilding of all the modified data segments in the selected PSD.

In another embodiment, a storage virtualization system for updating a control program of a PSD in a storage virtualization system is provided, the storage virtualization system comprising: a host entity for issuing an IO request; a storage virtualization controller coupled to the host entity for executing IO operations in response to the IO request; and a plurality of PSDs coupled to the storage virtualization controller for providing data storage space to the storage virtualization system, wherein at least one data stripe is provided in the plurality of PSDs, and at least one parity data chunks is provided in the same data stripe; wherein the storage virtualization controller updates the control program of the PSDs by the following steps, comprising: selecting at least one PSD to be updated with a control program therein; making the selected PSD enter an off-line state; updating the control program of the selected PSD, wherein if it needs to issue a write request to the selected PSD before completion of the control program update, an unmodified data segment corresponding to the write request is marked as a modified data segment; and performing a partial rebuilding on the selected PSD, after completion of the control program update, wherein if it needs to read data out from or write data into an unmodified data segment of the selected PSD before completion of the partial rebuilding, a read request or the write request is issued to the selected PSD directly without waiting for completion of the partial rebuilding of all the modified data segments in the selected PSD.

In another embodiment, a method for updating a control program of a PSD in a storage virtualization system is provided, the method comprising the steps of: providing a plurality of parity data chunks in the same data stripe; selecting at least one PSD desired to update a control program therein; making the selected PSD enter an off-line state; and updating the control program of the selected PSD, wherein if it needs to issue a write request to the selected PSD before the completion of the control program update, an unmodified data segment corresponding to the write request is marked as a modified data segment.

In another embodiment, a storage virtualization controller for updating a control program of a PSD in a storage virtualization system is provided, the storage virtualization controller comprising: a central processing circuitry (CPC); a host-side IO device interconnect controller used to connect the CPC and at least one host entity for receiving an IO request from the at least one host entity; and a device-side IO device interconnect controller used to connect the CPC and a plurality of PSDs for executing IO operations of the PSDs in response to the IO request received from the at least one host entity, wherein at least one data stripes is provided in the PSD and a plurality of parity data chunks are provided in the same data stripe, wherein the CPC updates the control program of the PSDs by the following steps, comprising: selecting at least one PSD to be updated with a control program; making the selected PSD enter an off-line state; updating the control program of the selected PSD, wherein if it needs to issue a write request to the selected PSD before the completion of the control program update, an unmodified data segment corresponding to the write request is marked as a modified data segment.

In another embodiment, a storage virtualization system for updating a control program of a PSD in a storage virtualization system is provided, the storage virtualization system comprising: a host entity for issuing an IO request; a storage virtualization controller coupled to the host entity for executing IO operations in response to the IO request; and a plurality of PSDs coupled to the storage virtualization controller for providing data storage space to the storage virtualization system, wherein at least one data stripes is provided in the plurality of PSDs and a plurality of parity data chunks are provided in the same data stripe, wherein the storage virtualization controller updates the control program of the PSDs by the following steps, comprising: selecting at least one PSD to be updated with a control program therein; making the selected PSD to enter an off-line state; updating the control program of the selected PSD, wherein if it needs to issue a write request to the selected PSD before the completion of the control program update, an unmodified data segment corresponding to the write request is marked as a modified data segment.

In another embodiment, if it needs to read the data out from a data segment of the selected PSD when the selected PSD is in a period of the control program update, redundant data of the data segment is used for computing the read data, and the read data is sent out.

In another embodiment, if it needs to write data into the modified data segment of the selected PSD, when the selected PSD is in a period of the control program update, the marking of the modified data segment remains unchanged.

In another embodiment, the partial rebuilding comprises the steps of: (a) selecting the modified data segment, using redundant data of the modified data segment for computation to obtain new data of the modified data segment, overwriting the modified data segment by the new data, and canceling the marking of the modified data segment; and (b) repeating step (a) until no modified data segment is existed in the selected PSD.

In another embodiment, if it needs to read the data out from a modified data segment of the selected PSD when the selected PSD is in a period of the partial rebuilding, redundant data of the modified data segment is used for computing the read data, and the read data is sent out.

In another embodiment, if it needs to write data into the modified data segment of the selected PSD when the selected PSD is in a period of the partial rebuilding, data in the modified data segment is overwritten by the write data corresponding to the modified data segment, and the marking of the modified data segment is canceled.

In another embodiment, if it needs to write the data into the modified data segment of the selected PSD when the selected PSD is in a period of the partial rebuilding, the marking of the modified data segment remains unchange.

In another embodiment, when there occurs a failure of PSD, and a total number of the off-line PSDs in the storage virtualization system is smaller than or equal to a number of parity PSDs, the control program update or the partial rebuilding of the selected PSD is continuously performed until the selected PSD completes the partial building.

In another embodiment, when there occurs a failure of PSD and a total number of off-line PSDs in the storage virtualization system is equal to a number of parity PSDs, read or write requests that access to the PSDs are temporarily stopped until the selected PSD completes the partial building.

In another embodiment, when there occurs a failure of PSD and a total number of off-line PSDs in the storage virtualization system is greater than a number of parity PSDs, the data on the modified data segment of the selected PSD is marked as bad data.

In another embodiment, when there occurs a failure of PSD, the failed PSD is performing the control program update or the partial rebuilding, if the failed PSD has the modified data segment, the marking of the modified data segment is cancelled.

In another embodiment, if a data linking status of the modified data segment is a status with linked data, the data corresponding to the write request issued to the selected PSD is stored in a memory and becomes a linked data.

In another embodiment, if a data linking status of the modified data segment is a status with linked data, and it needs to read data out from a data segment of the selected PSD when the selected PSD is in a period of the control program update, redundant data of the data segment is used for computing the read data, and the read data is sent out.

In another embodiment, if a data linking status of the modified data segment is a status with linked data, and it needs to read data out from the modified data segment of the selected PSD when the selected PSD is in a period of the control program update, the linked data of the modified data segment is directly sent out.

In another embodiment, if a data linking status of the modified data segment is a status with linked data, and if it needs to write data into the unmodified data segment of the selected PSD when the selected PSD is in a period of the control program update, the unmodified data segment is marked as the modified data segment, and the write data of the write request corresponding to the unmodified data segment is stored as the linked data.

In another embodiment, if a data linking status of the modified data segment is a status with linked data, and it needs to write data into the modified data segment of the selected PSD when the selected PSD is in a period of the control program update, the marking of the modified data segment remains unchanged, and the original linked data linked to the modified data segment is directly overwritten by the write data of the write request corresponding to the modified data segment.

In another embodiment, if a data linking status of the modified data segment is a status with linked data, the partial rebuilding comprises the steps of: (a) selecting the modified data segment, duplicating the linked data of the modified data segment to the modified data segment, and canceling the marking of the modified data segment; and (b) repeating step (a) until no the modified data segment exists in the selected PSD.

In another embodiment, if a data linking status of the modified data segment is a status with linked data, and it needs to read data out from the modified data segment of the selected PSD when the selected PSD is in a period of the partial rebuilding, the linked data linked to the modified data segment is directly sent out.

In another embodiment, if a data linking status of the modified data segment is a status with linked data, and it needs to write data into the modified data segment of the selected PSD when the selected PSD is in a period of the partial rebuilding, data in the modified data segment is directly overwritten by the write data of the the write request corresponding to the modified data segment, and the marking of the modified data segment is cancelled.

In another embodiment, if a data linking status of the modified data segment is a status with linked data, and it needs to write data into the modified data segment of the selected PSD when the selected PSD is in a period of the partial rebuilding, the marking of the modified data segment remains unchanged, and a original linked data linked to the modified data segment is directly overwritten by the write data of the write request corresponding to the modified data segment.

In another embodiment, if a data linking status of the modified data segment is a status with linked data, and when there occurs a failure of PSD and a total number of the failed PSDs in the storage virtualization system is smaller than or equal to a number of parity PSDs, a data loss does not occur, and the control program update or the partial rebuilding of the selected PSD is continuously performed until the selected PSD completes the partial building.

In another embodiment, if a data linking status of the modified data segment is a status with linked data, and when there occurs a failure of PSD and a total number of the failed PSDs in the storage virtualization system is equal to a number of parity PSDs, read or write requests that access to the PSDs are temporarily stopped until the selected PSD completes the partial building.

In another embodiment, if a data linking status of the modified data segment is a status with linked data, and when there occurs a failure of PSD, a total number of the failed PSDs and a number of PSDs that are performing the control program update are greater than a number of parity PSDs, if it needs to issue the read request corresponding the unmodified data segment of the selected PSD, the read request that accesses to the PSD is temporarily stopped until completion of the PSD that are performing the control program update, then redundant data of the unmodified data segment is used for computation the read data, and the read data is sent out.

In another embodiment, if a data linking status of the modified data segment is a status with linked data, and when there occurs a failure of PSD and a total number of the failed PSDs in the storage virtualization system is greater than a number of parity PSDs, the linked data linked to the modified data segment is duplicated to the modified data segment.

In another embodiment, if a data linking status of the modified data segment is a status with linked data, and when there occurs a failure of PSD, the failed PSD is performing the control program update or the partial rebuilding, if the failed PSD has the modified data segment, the marking of the modified data segment is cancelled.

In another embodiment, the storage virtualization system comprises a plurality of PSDs, a first memory device and a second memory device, wherein each of the PSDs comprises a plurality of data segments and a programmable control program, the first memory device is used for storing the marking of the modified data segment, and the second memory is used for storing a linked data linked to the marking.

In another embodiment, the first memory device and the second memory device are located in a memory of a redundant array of independent disks (RAID) controller.

In another embodiment, each of the first memory device and the second memory device is a dynamic random access memory (DRAM) or a non-volatile memory (NVRAM).

In another embodiment, the NVRAM is a hard disk or SSD or a DRAM to which a battery or a supercapacitor supplies power.

In another embodiment, the storage virtualization system comprises a plurality of a plurality of PSDs, each of which comprises a plurality of data segments and a programmable control program.

In another embodiment, the size of each of the data segment in PSD is the size of a data chunk, a cache memory or a logical block.

In another embodiment, if there is a number N of PSDs in storage virtualization system, and N is a nature number, the control program update for the number N of the PSDs in the system can be simultaneously performed without interrupting read or write requests issued from a host entity to the number N of PSDs.

In another embodiment, when there occurs a failure of PSD and a total number of the failed PSDs in the storage virtualization system is equal to a number of parity PSDs, read or write requests that access to the PSDs are temporarily stopped until the selected PSD completes the partial building.

In another embodiment, further comprising the steps of: providing at least one data stripe on the PSDs, and providing a plurality of parity data chunks in the same data stripe.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
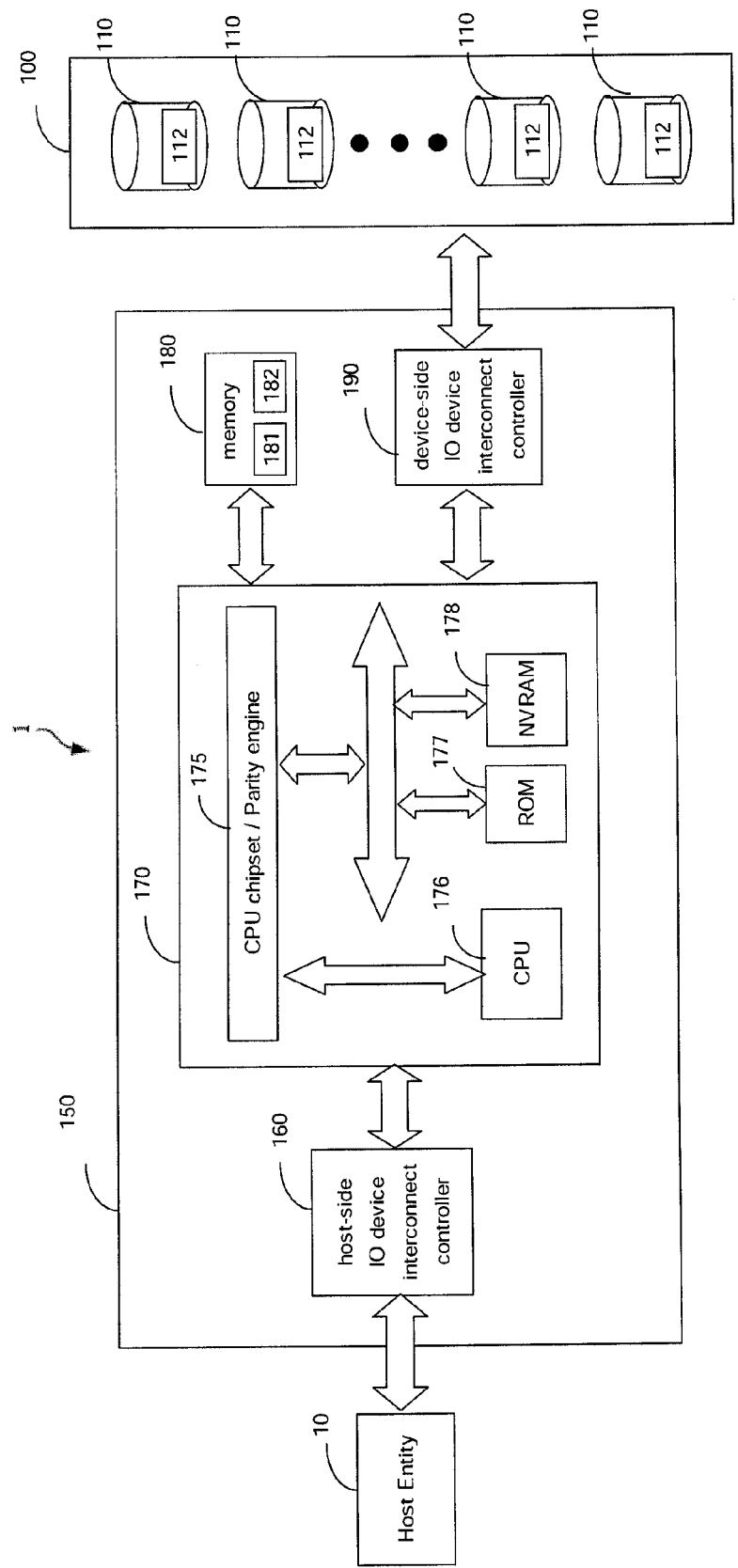
FIG. 1 is a block diagram showing the connection relationship among a host entity, a RAID controller and a PSD array in a storage virtualization system.

Reference will now be made in detail to the present preferred embodiments of the invention, examples of which are illustrated in the accompanying drawings. Wherever possible, the same reference numbers are used in the drawings and the description to refer to the same or like parts.

Technique of Storage Virtualization

A storage virtualization technique has been widely applied in digital storage systems, which may combine a plurality of physical storage devices (PSDs) into a logical storage unit that is accessible by a host entity, such as a logical disk drive (LD). The primary application of the storage virtualization technique is to combine smaller PSDs into a logical storage device which is of larger capacity, greater fault tolerance and higher performance. When one of the PSDs of the storage virtualization system fails, after the failed PSD is replaced by a new PSD, a data rebuilding procedure can be performed by using user data and parity data stored in other PSDs to regenerate the original data stored in the failed PSD and store the original data into the new PSD.

FIG. 1 shows a storage virtualization system according to an embodiment of the present invention. The storage virtualization system 1 comprises a redundant array of independent disks (RAID) controller 150 coupled to a host entity 10; and a PSD array 100 that is coupled to the RAID controller 150. The host entity 10 can be a host computer, such as a sever system, a workstation, or a personal computer etc. Further, the aforementioned storage virtualization system 1 can also be a host computer with a built-in RAID card and with a PSD array 100, such as a storage server.

A storage virtualization controller (SVC) is primarily used to map the combinations of respective sections of physical storage media into logical media units that is visible to a host system. After being received by the SVC, IO requests issued from the host system are first parsed and interpreted, and associated operations and data are translated into PSD IO requests by the SVC, and the PSD IO requests are issued to the PSDs. This process may be indirect with operations cached, delayed (such as write-back), anticipated operations (such as read-ahead), grouped operations, etc., so as to enhance performance and other operational characteristics, so that a host IO request may not necessarily be directly corresponding to PSD IO requests in a one-to-one fashion. Hence, one read or write request from the host entity 10 may be corresponding to one or more PSD read(s) or write request(s), and a plurality of read or write requests from the host entity 10 may also be corresponding to one PSD read or write request. As a result, one PSD read or write request may be corresponding to one or more read or write request(s) from the host entity 10, and a plurality of PSD may also be corresponding to one read or write request from the host entity 10.

According to one embodiment of the present invention, the RAID controller 150 can be a SVC controller which can perform storage virtualization procedures on a plurality of PSDs 110 in the PSD array 100, and which can map the PSDs 110 into one or more logical disk(s) (LD) that is(are) shown on the host entity 10, wherein the logical disk(s) can be configured to a plurality of logical blocks for storing data.

According to one embodiment of the present invention, the RAID controller 150 comprises a host-side IO (input and output) device interconnect controller 160, a central processing circuitry (CPC) 170, a memory 180 and a device-side IO device interconnect controller 190. The host-side IO device interconnect controller 160 is connected between the host entity 10 and the CPC 170 as an interface and buffer between the RAID controller 150 and the host entity 10. The host-side IO device interconnect controller 160 is used for receiving an IO request and associated data from the host entity 10 and for mapping and/or transferring the IO request and the associated data to the CPC 170. The CPC 170 comprises a central processing unit (CPU) chipset/parity engine 175, a CPU 176, a read-only memory (ROM) 177 and a non-volatile random access memory (NVRAM) 178.

According to one embodiment of the present invention, the CPU chipset/parity engine 175 receives write data from the host entity 10. After the write data are processed by the CPU chipset/parity engine 175, one or more set(s) of parity data is(are) generated, and then the write data and the one or more set(s) of parity data are written into the PSDs 110. If there are a plurality of sets of parity data, the plurality of sets of parity data are obtained by different algorithms. Further, when one of PSD 110 in the PSD array fails, after the failed PSD is replaced by a new PSD, the CPU chipset/parity engine 175 can be used to execute a parity computation by using the user data and the one or more set(s) of parity data stored on other PSDs in the PSD array 100, so as to regenerate the original data stored on the failed PSD and store the computation result onto the new PSD. Some information regarding the IO operation execution status of the PSD array 100 is saved in the NVRAM 178, and is used for examination when the power is recovered from an abnormal power shut-down that occurs before completion of the IO operation execution. The memory 180 can be a dynamic random access memory (DRAM) or a non-volatile memory used for storing system start and control programs and other temporary data. According to one embodiment of the present invention, the memory 180 may further comprise a first memory 181 used for storing determination data and a second memory 182 for storing linked data linking to the aforementioned determination data. The determination data and linked data will be explained later. According to another embodiment of the present invention, the first memory 181 and the second memory 182 both can be dynamic random access memories (DRAMs), or both can be non-volatile random access memories (NVRAMs), or can be a combination that one of the first memory 181 and the second memory 182 is DRAM and the other one of the first memory 181 and the second memory 182 is NVRAM. The aforementioned NVRAM can be a flash memory, an electrically erasable programmable read-only memory (EEPROM), a magnetic random access memory (MRAM) or a ferroelectric RAM (FRAM), etc. The NVRAM can even be a DRAM that is equipped with a battery or a super capacitor or with other backup power used for providing power thereto, or can be other storage medium which can keep data stored for a while when power is off.

According to one embodiment of the present invention, the device-side IO device interconnect controller 190 is coupled between the CPC 170 and the PSD array 100 as an interface and buffer therebetween, thereby writing the data that have already processed by the CPC 170, into the PSD array 100, or reading data out from the PSD array 100 and sending the read data to the CPC 170.

According to one embodiment of the present invention, the PSD array 100 comprises a plurality of PSDs 110, such as hard disk drives (HDDs), solid state disks (SSDs), optical disc drives or digital versatile disc (DVD) drives, etc., into which data are stored by the storage virtualization system 1. Each of the PSDs 110 comprises a NVRAM and one or more recording medium(s). There is a control program 112 stored in the NVRAM for performing IO control associated with the PSDs 110. The control program 112 can be programmable codes, and thus a new control program 112 can be written into the PSDs 110 via an IO interface of the PSDs 110 so as to overwrite the original control program 112. The recording mediums of the PSDs 110 can be configured to a plurality of data segments used for storing data, wherein the size of each of data segments can be varied.

When the aforementioned host entity 10 is to write data into the PSD array 100, the data is first temporarily stored in the memory 180, and then the data in the memory 180 is stored into the PSD 110, wherein the data transmitting path is as the following sequence: the host entity 10, the host-side IO device interconnect controller 160, the CPC 170, the memory 180, the CPC 170, the device-side IO device interconnect controller 190, the PSD array 100. When the host entity 10 is to read data out from the PSD array 100, first the PSD array 100 temporarily stores the data into the memory 180, and then delivers the data in the memory 180 to the host entity 10, wherein the data transmitting path is as the following sequence: the PSD array 100, the device-side IO device interconnect controller 190, the CPC 170, the memory 180, the CPC 170, the host-side IO device interconnect controller 160, the host entity 10.

The storage virtualization system 1 of the present invention comprises at least one set of parity data used for checking user data, a memory device, at least one RAID controller and a plurality of PSDs, wherein each of the PSDs comprises a plurality of data segments and a programmable control program.

Figure 2:
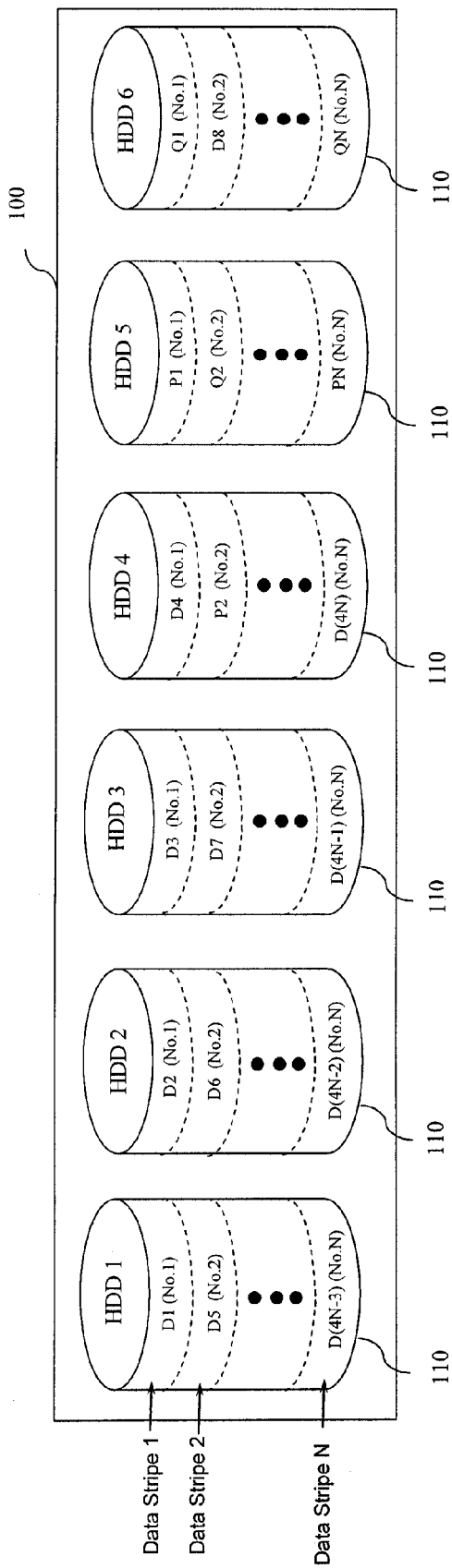
FIG. 2A is a schematic diagram showing the relationship between the PSD array and the data stored in the respective PSDs of the PSD array.
FIG. 2B is a schematic diagram showing the relationships between data stripes and the data stored in the respective PSDs of the data stripe.

According to one embodiment of the present invention, FIG. 2A is a block diagram showing the PSD array 100 of FIG. 1. In this embodiment, the PSDs 110 are HDDs. In FIG. 2A, the PSD array 100 comprises six HDDs 110, but in actual applications, is not limited to this number (six). Each of HDD1 to HDD6 comprises a plurality of data chunks (or simply referred to as chunks), such as D1, D5 ... D(4N-3) in HDD1; D2, D6 ... D(4N-2) in HDD2; D3, D7 ... D(4N-1) in HDD3; or D4, P2 ... D(4N) in HDD4; P, Q2 ... PN in HDD5; or Q1, D8 ... QN in HDD6, wherein each of D1 ... D(4N), P1 ... PN, Q1 ... QN is referred to as a data chunk. Each data chunk has a reference number (No.), and in each HDD 110, the data chunks with the same number can be combined into a data stripe (or simply referred to as a stripe) comprising a plurality of user data chunks and two parity data chunks. In FIG. 2A, stripe 1 is composed of data chunks D1, D2, D3, D4, P1 and Q1 of which the reference numbers are the same as No. 1, wherein data chunks D1, D2, D3 and D4 are user data chunks, and data chunks P1 and Q1 are parity data chunks; and stripe 2 is composed of data chunks D5, D6, D7, P2, Q2 and D8 of which the reference numbers are the same as No. 2, wherein data chunks D5, D6, D7 and D8 are user data chunks, and data chunks P2 and Q2 are parity data chunks. In the similar way, strip N is composed of D(4N-3), D(4N-2), D(4N-1), D(4N), PN and QN of which the reference numbers are the same as No. N, wherein data chunks D(4N-3), D(4N-2), D(4N-1) and D(4N) are user data chunks, and data chunks PN and QN are parity data chunks.

It can be known from the above that the data in the PSD array 100 are composed of the data in N data stripes, and the parity data chunks can be evenly distributed on HDD1 to HDD6, or stored in two parity HDDs (not shown) of HDD1 to HDD6. The parity data chunk P1 can be obtained by executing a parity computation through using the user data chunks D1, D2, D3 and D4; another data parity chunk Q1 can be obtained by executing another parity computation through using the user data chunks D1, D2, D3 and D4, in which the another parity computation is different from the parity computation for obtaining the parity data chunk P1. The data in D1 can also be obtained by executing different parity computations respectively through either using data chunks D2, D3, D4 and P1 or using data chunks D2, D3, D4 and Q1. Accordingly, the data in any one data chunk (not limited to a user data chunk or to a parity data chunk) of the same data stripe can be obtained by executing a parity computation through using the data in the data chunks of other HDDs in the same data stripe having the same reference numbers. All data in the data chunks of the same data stripe are referred to as redundant data. Therefore, when data in data chunks D1, D2, D3 or D4 fail to be read out, the data that fail to be read out can be obtained by performing a parity computation through using other redundant data in the same data stripe. Although only two sets of parity data chunks P and Q are shown in FIG. 2A, in actual applications, the number of set of parity data chunks is not limited thereto and can be three or more than three different sets of parity chunks.

In HDD1 to HDD6, each HDD comprises a plurality of data segments used for storing data, wherein each data segment has a reference number, and the size of each data segment can be configured. According to the difference of the configuration, the size of the data segment can be the size of a sector, a logical block, a cache buffer or a data chunk, etc. In an example shown in FIG. 2A, the size of the data segment is the size of a data chunk while in an example shown in FIG. 2B, one data chunk contains a plurality of data segments. For example, the data chunk D1 contains data segments D1-1, D1-2, D1-3 and D1-4, and meanwhile, one user data chunk contains a plurality of user data segments, and one parity data chunk contains a plurality of parity data segments. When data in data segment fails to be read out, the data that fails to be read out can be obtained by executing a parity computation through using the data in other redundant data segments including user data segments and parity data segments in the same data stripe.

The RAID controller 150 may receive a read or write request from the host entity 10, data of the read or write request corresponding to the HDD(s) may merely contain a portion of data in one data chunk, or may contain the data in one or more data chunk(s).

Figure 3:
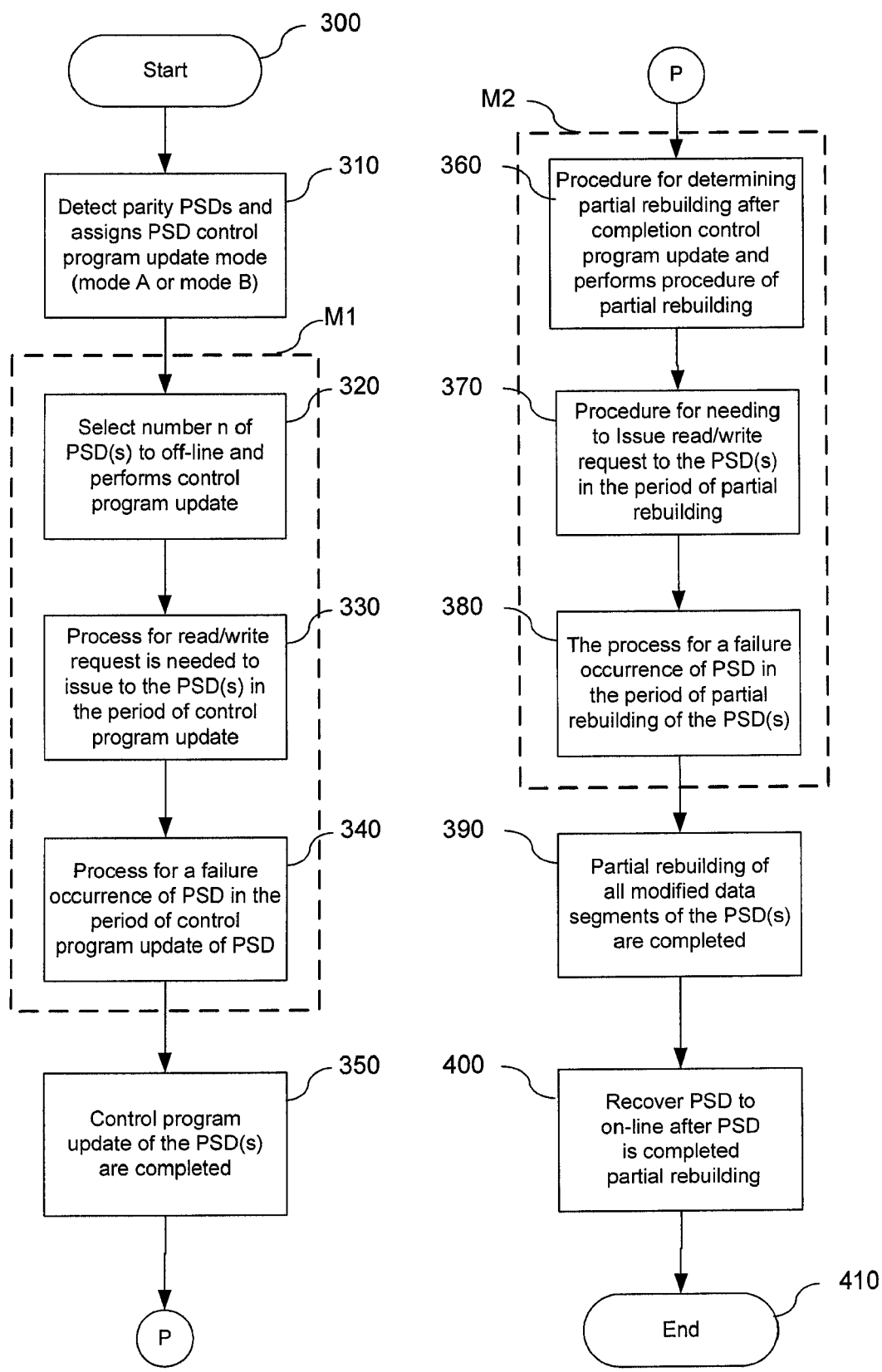
FIG. 3 is a schematic flow chart for updating a control program of a PSD.

FIG. 3 is a schematic flow chart of the present invention. In FIG. 3, the RAID controller performs an operation of updating the control program(s) of one or more PSD(s) in the storage virtualization system at the same time, the operation comprising processing procedures being performed if the RAID controller is to issue one or more read/write request (R/W request) to one or more PSD(s) when the one or more PSD(s) is(are) in the period of the control program(s) update or partial building; further comprising processing procedures being performed if one of the PSDs fails when the one or more PSD(s) is(are) in the period of the control program(s) update or partial building. In the present invention, the so-called "partial rebuilding" means that after completion of updating the control program of one of PSDs, the RAID controller updates data on modified data segment(s) in the PSD. The so-called "modified data segment" means that the data in data segment of the PSD need to be updated (written) due to a write request, but cannot be updated (written) according to the write request because the control program update is being performed on the PSD, and thus at this moment, the data in the modified data segment under aforesaid current status are incorrect old data. Data segment which is not marked as the modified data segment is referred to as an unmodified data segment. To update the data during period of the partial rebuilding, the user data and parity data in the same data stripe may be used to execute a parity computation according to the modified data segment, so as to regenerate correct user data that are associated with the modified data segment and thereby to update the old data in the modified data segment by the regenerated correct user data or by linked data linking to the modified data segment, wherein the linked data will be explained later. A flow process for updating the control program of the PSD starts at step 300.

In step 310, the RAID controller (hereinafter called controller) 150 in the storage virtualization system detects the number of parity PSDs, and a PSD control program update mode is assigned. Herein, the so-called number of the parity PSDs means the number of parity data chunks contained in the same data stripe. The case in which there is no parity PSD (i.e. the number of the parity PSDs is 0) is not within the scope discussed by the present invention. According to the embodiment of the present invention, in the hardware configuration of the storage virtualization system, the number of the parity PSDs is one or greater than one. The update mode of the PSD control program can be a PSD control program update mode A or a PSD control program update mode B. When one of the PSDs is in the period of updating the control program, if the controller needs to issue a write request to that PSD that is in the period of updating the control program, because the data of that write request cannot be written into the PSD at that time, the controller will record the data segment in the PSD corresponding to the write request as a determination data used for determining if PSD data segment is a modified data segment, wherein the record means that during the period of the control program update of the PSD, the data in the data segment of that PSD have been modified, and upon completion of the control program update of the PSD, the data in the modified data segment must be updated with correct data. If only the data segment with data change is recorded in the determination data, but the write data (i.e. linked data) of the write request, in which the write data correspond to the data segment of the PSD are not saved, then the PSD control program update mode A is assigned. In addition to the fact that the data segment with data change is recorded, if the linked data is also saved, and the data segment with data change is linked to the linked data via the determination data, then the PSD control program update mode B is assigned. Since the write data of the write request, in which the write data correspond to the data segment (with data change) of the PSD are linked together by using the determination data, the write data of the PSD corresponding to the write request is referred to as the linked data. Meanwhile, a data linking status of the data segment that is marked as a modified data segment is a status which has a linked data. The determination data can be a modified data segment table, or the data in an array, a link list or other different data structure.

In one embodiment of the present invention, the determination data and the linked data can be stored in the first memory 181 and the second memory 182 of the memory 180 respectively. In another embodiment of the present invention, the determination data and the linked data also can be stored in other memories except the memory 180, or even stored in a memory that is outside the RAID controller. The aforementioned memories can also be hard disk drives or other storage media which can keep data stored for a while when power is off. The aforementioned hard disk drives may comprise common hard disk drives equipped with motor devices or solid state disks (SSDs). The determination data also can be distributed and stored in the respective PSDs, for example, in the reserved space or even the respective data segment of each PSD. In the following embodiments, the present invention is explained by an example which mainly uses the modified data segment table as the determination data, wherein the modified data segment table is used to record the reference numbers of modified data segments for determining if PSD data segment is the modified data segment.

In step 320, the controller selects number n of PSDs and sets the selected PSDs to an off-line state, and then performs updating the control programs of the number n of PSDs. In one embodiment, when there is no failure of PSD in the system, the number n of the PSDs that are selected for updating their control programs is not greater than the number m of the parity PSDs, wherein the relationship between n and m is: $1 \leq n \leq m$, and n and m are positive integers. In another embodiment, if there are number f of failed PSDs, the maximum value of n is limited to m−f, wherein the relationship among n, f, and m is: $1 \leq n \leq m-f$, where m, n and f are positive integers.

Step 330 is a procedure that is performed by the controller if the controller needs to issue a read/write request to the PSD(s) during updating the control program of the PSD(s). When the controller receives one or more read/write request(s) issued from the host entity to the PSD(s), the controller will issue the one or more PSD read/write request(s) corresponding thereto. When the PSD(s) of which the control program(s) is(are) to be updated is(are) in the period of the control program update, and the controller needs to issue one or more corresponding read/write request(s) to the PSD(s), the controller will not issue the read/write request to the PSD(s) of which the control program(s) is being updated, instead, in this period of updating the control program(s) of the PSD(s), the controller will change the procedures for processing the read/write request that needs to be issued to the PSD(s).

Step 340 is a processing procedure that is performed by the controller when there occurs a failure of PSD during updating the control program of the PSD(s). Due to different numbers of the parity PSDs and different update modes, the number of the failed PSDs which is tolerable by the storage virtualization system is also different, and the controller will execute corresponding procedures based on actual situations.

With regard to steps 320, 330 and 340, those three steps are enclosed by dotted lines and represented by M1. In FIG. 3, although the three steps in M1 are shown in one after another in the follow chart, they can be performed simultaneously in actual applications.

In step 350, the PSD(s) completes the control program update. When there are two or more PSDs that are performed with the control program update, the respective PSDs performs the procedures of its control program update independently, i.e. the procedures of the control program update can be performed at the same time or at different times.

Step 360 is a procedure performed by the controller to determine if it is necessary to perform partial rebuilding after the PSD(s) completes the control program update and then a procedure is performed by the controller to perform the partial rebuilding. If the PSD(s) is in the period of the control program update; and the controller needs to issue a write request to the PSD(s) to change the data in the PSD(s) (for example, when the controller receives one or more write request(s) issued from the host entity to the PSD(s)), it is necessary to perform partial rebuilding on the PSD(s) after completion of the control program update.

Step 370 is a processing procedure performed by the controller, if the controller needs to issue a read/write request to the PSD(s) when the PSD(s) is in the period of partial rebuilding. When the controller is performing the partial rebuilding of the PSD(s) and needs to issue the read/write request to the PSD(s), the procedure for processing the read/write request will be changed, and the controller may not necessarily to issue the read/write request(s) to the PSD(s) of which the period of partial rebuilding is performed ; and in the period of partial rebuilding, the controller may directly issue the read or write request to the unmodified data segment in the PSD(s), but has different processing manners with respect to the modified data segment of the PSD(s).

Step 380 is a processing procedure performed by the controller, if there occurs a failure of PSD when the PSD(s) is in the period of partial rebuilding. Due to different numbers of the parity PSDs and different update modes, the number of the failed PSDs allowed in the storage virtualization system is also different. The controller will execute corresponding procedures based on actual situations.

With regard to steps 360, 370 and 380, those three steps are enclosed by dotted lines and represented by M2. Although the three steps in M2 are shown in one after another in the follow chart, they can be performed simultaneously in actual applications.

In step 390, the controller completes the partial rebuilding of the PSD(s). The time for completing the partial rebuilding of each PSD(s) varies in accordance with the number of the write requests to be issued to the PSD(s) when the PSD(s) is in the period of the control program update. The PSD(s) first completing the partial rebuilding may be first recovered to be on-line.

In step 400, the controller makes the PSD(s) on-line, which has(have) completed the partial rebuilding. As shown in FIG. 3, the flow process for updating the control program of the PSD(s) ends at step 410. If there is other PSD needs to update its control program, the flow process returns to step 300.

Figure 4:
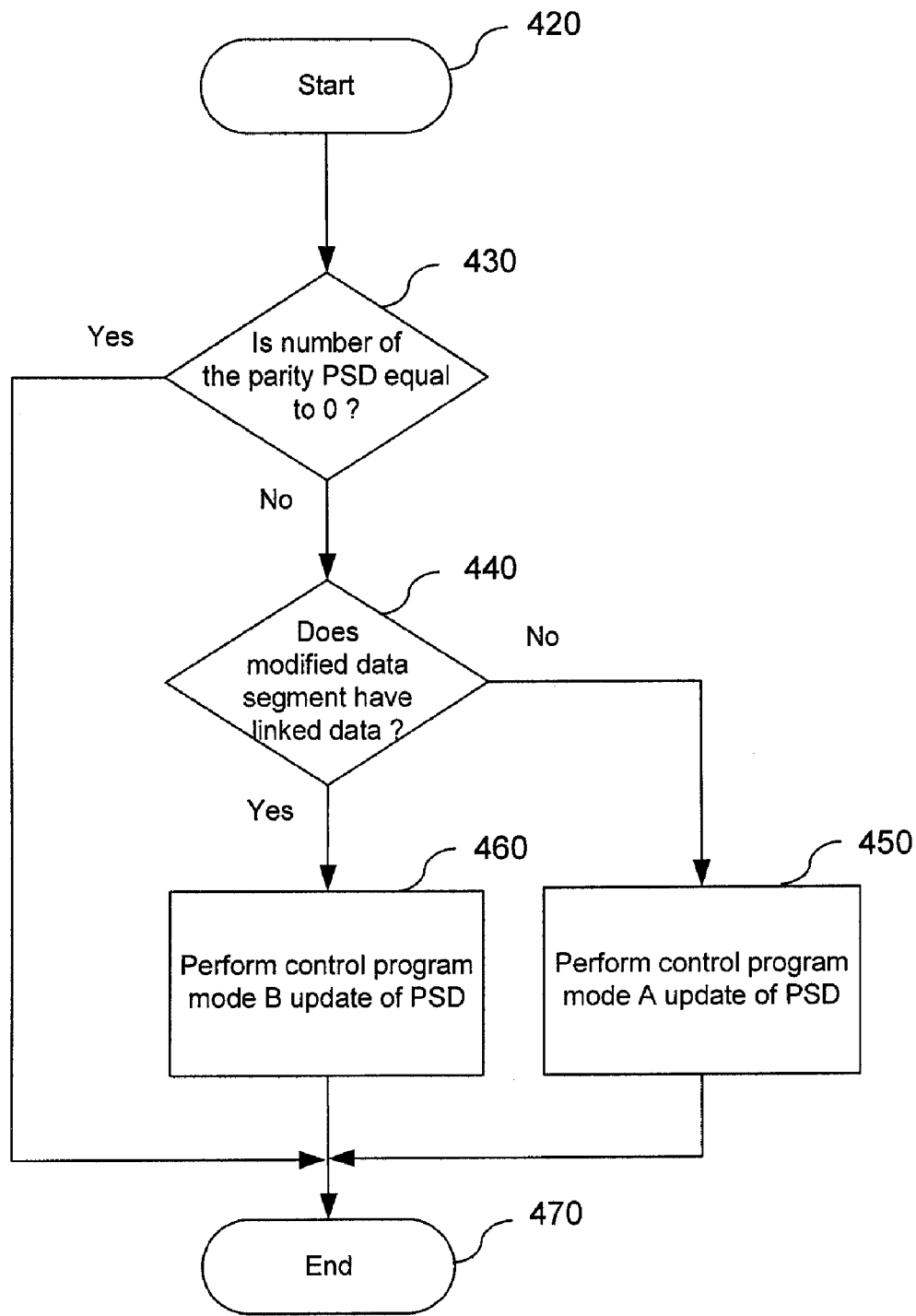
FIG. 4 is flow chart of an embodiment of the present invention.

FIG. 4 is a flow process of the control program update performed by the controller as shown in FIG. 3. The flow process of the control program update starts at step 420.

In step 430, the controller 150 detects if the number m of the parity PSDs in the storage virtualization system is equal to 0. If the result is yes, it means that no parity PSD exists in the system, and thus, when the PSD(s) is in the period of the control program update; and the controller 150 needs to issue a read request to the PSD(s), the data in the PSD(s) cannot be read out at that time, and the controller 150 will not be able to respond to the read request from the host entity. Therefore, when the storage virtualization system is on-line, the control program update of the PSD(s) cannot be performed under the circumstance in which there is no parity PSD. Consequently, the flow process directly jumps to step 470 after the determination in step 430, thus ending the flow process. If the result is no, meaning that the controller 150 has detected number m of the parity PSDs (m≧1) in the storage virtualization system, then step 440 is performed.

In step 440, the controller 150 determines if a data linking status of the modified data segment is a status having the linked data. If the result is no, the controller 150 performs the PSD control program update mode A in step 450, the PSD control program update mode A does not link the write data (i.e. linked data) of the write request, in which the write data correspond to the modified segment. If the result is yes, the controller 150 performs the PSD control program update mode B in step 460, the PSD control program update mode B links the write data (i.e. linked data) of the write request, in which the write data correspond to the modified segment. In one embodiment, the selection of the PSD control program update modes A and B can be determined in accordance with remaining memory space in the NVRAM. In one embodiment, when there is more remaining memory space, the PSD control program update mode B is performed, and on the contrary, when there is less remaining memory space, the PSD control program update mode A is performed. As shown in FIG. 4, the flow process of the PSD control program update performed by the controller 150 ends at step 470.

FIG. 5 to FIG. 8 show a flow chart process of the PSD control program update mode A in detail. The PSD control program update mode A starts at step 500 in FIG. 5. In step 510, the controller 150 selects number n of PSDs 110 in the PSD array 100, to be updated with their control programs, so as to update the control programs 112 of PSD(s). In one embodiment, when no failure of PSD occurs in the system, the number n of the PSDs that is selected for updating their control programs is not greater than the number m of the parity PSDs, and the relationship between n and m is: $1 \leq n \leq m$. In another embodiment, if there occurs number f of failed PSDs, the maximum value of n is limited to m−f, wherein the relationship among n, f, and m is: $1 \leq n \leq m-f$, where m, n and f are positive integers. The number n of PSDs can be selected by a person who administrates the storage virtualization system, or the control program update of the n number of PSDs can be arranged by a program. If the storage virtualization system has number m of parity PSDs, then the present invention at most may simultaneously perform the control program update for number m of PSDs. In comparison with a conventional storage virtualization system having only single parity PSD, the present storage virtualization system at most may reduce the time for performing the PSD control program update to 1/m of the conventional one. Therefore, the overall operation performance of the present storage virtualization system can be apparently increased. The more parity PSDs the system has, the higher efficiency the present invention have.

In the PSD control program update mode A, the controller 150 performs a series of procedures with respect to each selected PSD to be updated with its control program, the procedures including steps 520 to 650 shown in FIG. 5 to FIG. 8. Each PSD is performed its series of procedures based on the actual situations, i.e. the series of procedures performed by the respective PSDs are independent from each other, which can be performed at the same time (parallel processing) or performed one after another.

In step 520, the controller 150 sets the selected PSD 110 waiting for updating its control program 112, to an off-line state. In the present invention, the off-line state means a period of time during from the start of the control program update through completion of partial rebuilding to recovery back to on-line state. Further, when any PSD 110 in the PSD array 100 fails, the failed PSD 110 cannot be controlled by the controller 150 any more, and thus the failed PSD 110 is also considered as being in the off-line state. Among the plurality of PSDs in the PSD array 100, the information regarding those PSDs have been completed with the control program update and regarding the on-line/off-line state of the PSDs can be recorded in the NVRAM 178 (such as a FRAM), another PSD or another storage medium in which the data will not be lost due to power-off, so that the on-line/off-line record of the PSD can always be reserved. Consequently, when the modified data segment table is lost due to a exhausted or damaged battery, the controller 150 may directly rebuild all the data of the selected PSD based on the on-line/off-line record after power recovery.

In step 530, the controller 150 performs the update of the control program 112 of the selected PSD 110. Since the storage virtualization system may include the PSDs simultaneously with one or more different transmission interfaces, such as a serial advanced technology attached (SATA) interface, a serial attached small computer system interface (SCSI) or a fibre channel (FC) interface, etc., and thus the PSDs with different transmission interfaces and different brand names have their corresponding PSD control programs. Therefore, the controller 150 selects and loads in the control programs codes corresponding to the transmission interface, brand name and model number of each PSD 110. The control program codes 112 are first loaded into the controller 150 via the host entity 10, and then the controller 150 writes the control program codes into the NVRAM of the PSDs 110. The time for updating the control program of the PSDs 110 varies in accordance with the characteristics of the PSDs, and is about between several ten seconds and several minutes.

The aforementioned three steps 510, 520 and 530 are detailed processing steps of step 320 shown in FIG. 3.

When the controller 150 receives a write request issued from the host entity 10 to PSD, the control 150 needs to perform a computation through using the data corresponding to the write request, so as to generate new parity data to replace the original parity data.

Figure 6:
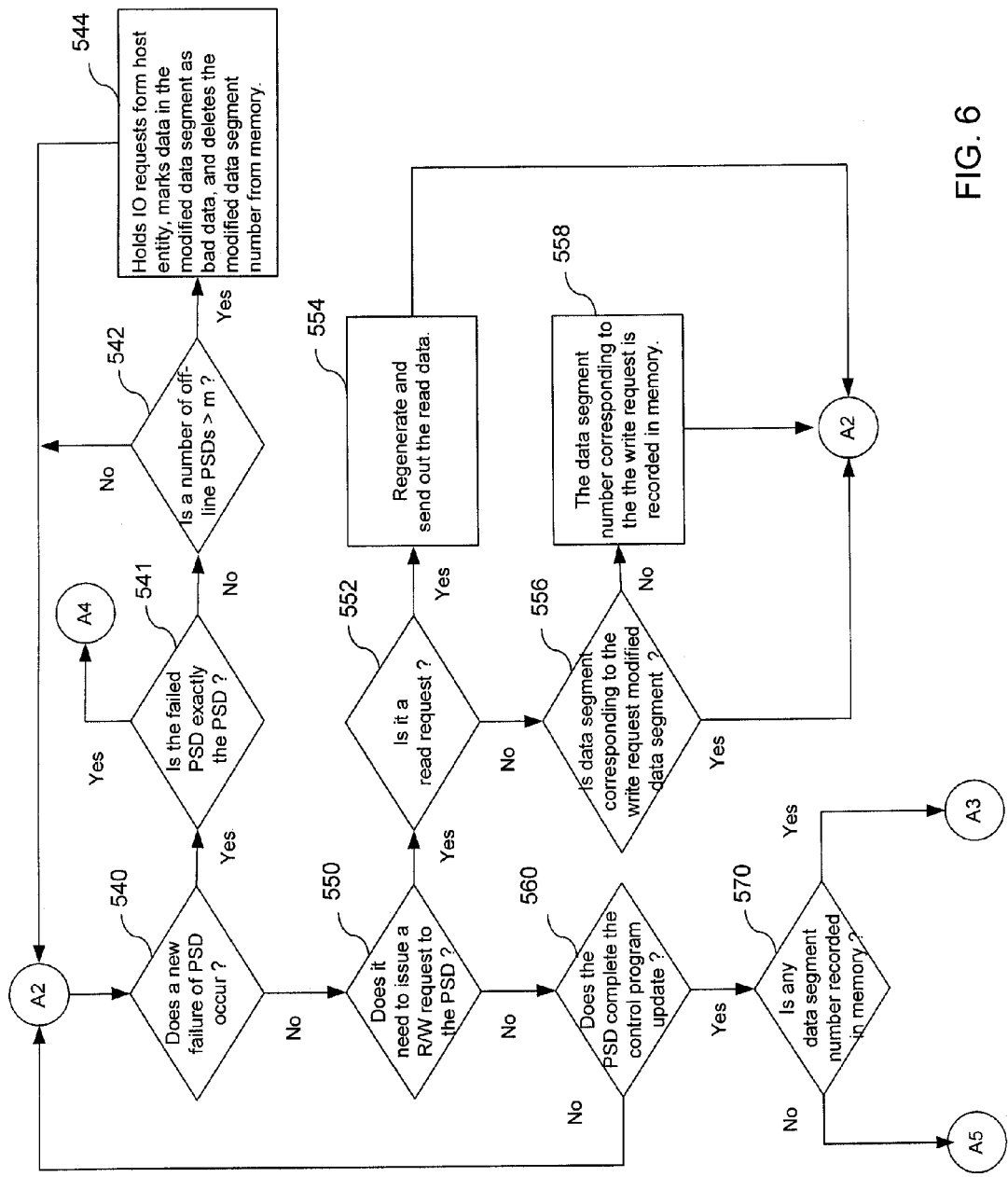

When a read or write request issued from the host entity is to access the data in the PSD 110 which is in off-line state for performing the control program update, step 540 in FIG. 6 is performed.

Figures 5, 8:
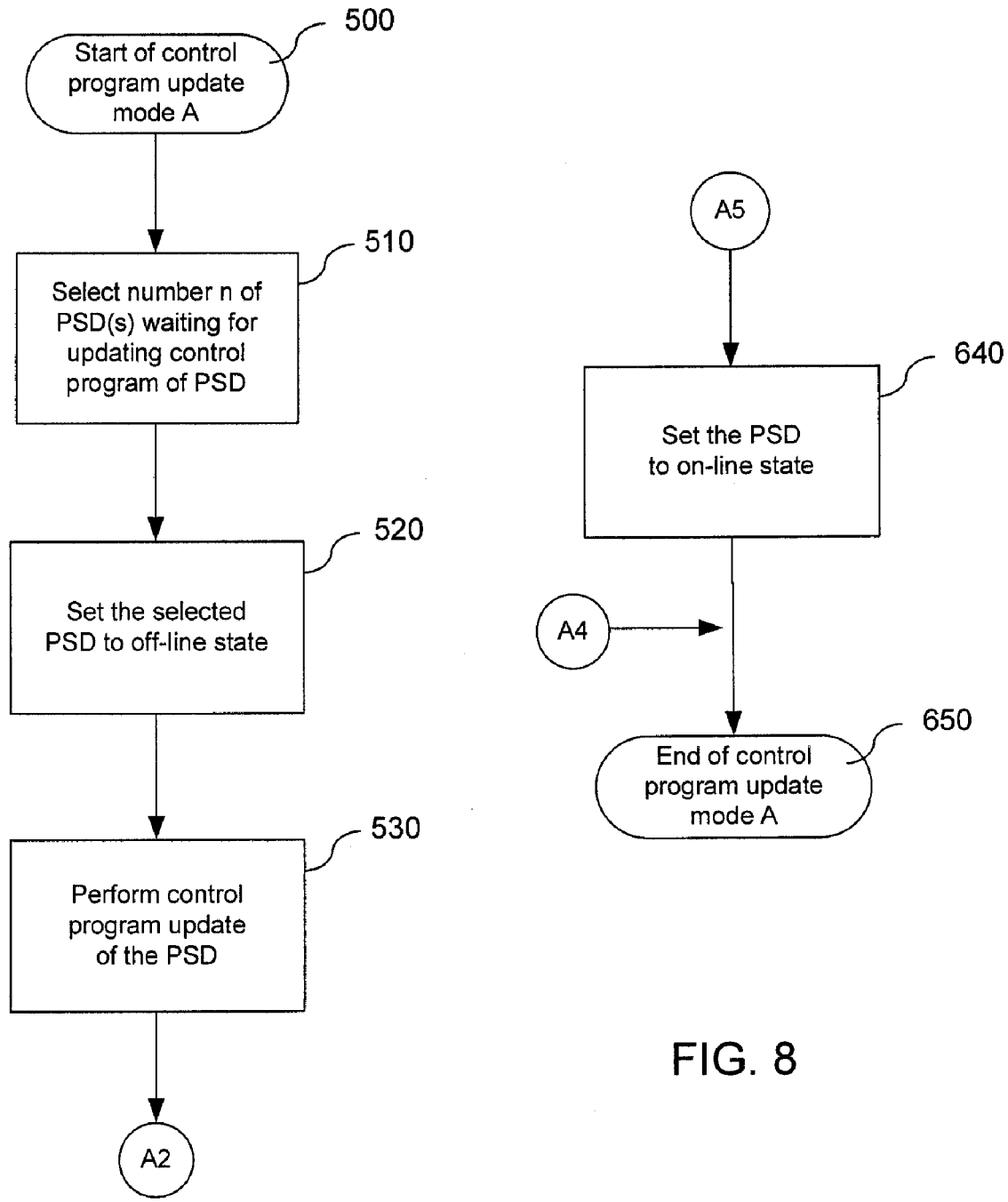
FIG. 5 through FIG. 8 are detailed flow charts of a PSD control program update mode A according to an embodiment of the present invention.

FIG. 6 is a flow chart followed after FIG. 5. In step 540, the controller 150 detects if there occurs a new failure of PSD in the storage virtualization system during the period of the control program update. If the result is no, step 550 is performed; and if the result is yes, step 541 is performed. In the present invention, when the situation of failure of PSD occurs, the controller 150 will record the failed PSD. The "new failure of PSD" indicated herein stands for the PSD which has failed but has not been recorded by the controller 150 yet. If the failure of PSD has ever occurred and has been records by the controller 150, it is considered that no new failure of PSD occurs.

In step 541, the controller 150 determines if the failed PSD is the PSD which is being performed with the control program update. If the result is yes, the flow process jumps to step 650, and the step 650 ends the PSD control program update mode A. If the result is no, step 542 is performed. While the determination of step 541 is being performed, the related data of the failed PSD is recorded at the same time by the controller 150, and if the modified data segment number of the failed PSD has been recorded in the modified data segment table, the controller 150 will delete all of the data segment number(s) of the failed PSD from the modified data segment table.

In step 542, the controller 150 determines if the total number of the off-line PSDs in the system is greater than the number m of the parity PSDs. If the result is yes, step 544 is performed; and if the result is no, step 540 is performed.

In the embodiment of the present invention, if the number of the parity PSDs in the system is m under the PSD control program update mode A, the total number of the off-line PSDs of the PSD array 100 during the period of control program update or partial rebuilding tolerable by the system is m. The failed PSDs include a failed PSD which is updating its control program; a failed PSD which is performing partial rebuilding, and a failed PSD which is caused by other factors. Besides the failed PSD, the so-called off-line PSDs in the present invention also include a PSD which is updating its control program; and a PSD which is performing partial rebuilding. If the total number of the off-line PSDs is greater than m, the data in modified data segment of the PSD 110 which is performing the control program update cannot be rebuilt through performing partial rebuilding by using the data in the data segments of other PSDs which have the same reference number as the modified data segment, and thus partial data loss occurs in the storage virtualization system, and the storage virtualization system cannot be normally operated any more. On the contrary, if the total number of the off-line PSDs is not greater than m, the system can be operated continuously.

In step 542, according to one embodiment, when the total number of the failed PSDs, the off-line PSDs which are performing the control program update, and the off-line PSDs which are performing partial rebuilding is smaller than or equal to the number m of the parity PSDs, the controller 150 may continue to receive IO requests from the host entity without losing data and other procedures can be performed continuously, so that the flow process jumps to step 540. According to another embodiment, if the total number of the failed PSDs, the off-line PSDs which are performing the control program update, and the off-line PSDs which are performing partial rebuilding is equal to the number m of the parity PSDs, the system is at a critical point for tolerating the maximum amount of failed PSDs. Although the system at the critical point will not lose data, in order to reduce the system risk, the controller 150 will temporarily stop receiving IO requests from the host entity. After the PSD has performed step 640, the controller 150 will recover to receive IO requests from the host entity and accept performing the control program update for other PSDs again.

In the aforementioned step 542, RAID 6 having two parity PSDs in storage virtualization system is used as an example. When one of the PSDs in the system is performing the control program update, the system can tolerate another one failed PSD without causing partial data loss. After the failed PSD is replaced by a new PSD, the original data in the failed PSD can be rebuilt by using a parity computation. In case where the system has already had one of PSD which is performing the control program update, and there are two or more PSDs which are failed, the system will lose partial data.

In step 544, because there has already existed the failed PSD, the total number of the off-line PSDs in the storage virtualization system has exceeded the maximum limit of the off-line PSDs tolerable by the storage virtualization system, partial data loss occurs in the system, and the storage virtualization system cannot be normally operated any more. Therefore, in one embodiment, the controller 150 stops receiving IO requests from the host entity 10, and at this moment, the PSD which is performing the control program update may continuously perform the control program update till completion of the control program update, and does not need to perform partial rebuilding. The controller 150 will mark the data in a modified data segment of the PSD as bad data; and if the modified data segment number of the PSD has been recorded in the modified data segment table, the controller 150 will delete all the data segment number of the PSD from the modified data segment table. After completion of step 544, the flow process jumps back to step 540, and after steps 540 to 570 have been performed, the PSD 110 is recovered and is on-line (step 640), and the procedures of the PSD control program update mode A is ended (step 650).

Since the failed PSD has an occurrence of data loss, the data in the modified data segment of the aforementioned PSD cannot be recovered to correct data by partial rebuilding, and thus the data in the modified data segment of the PSD 110 are incorrect data. Therefore, in one embodiment, the controller 150 marks the data in the modified data segment of the PSD 110 as bad data. If it is desired later to access the data segment in the PSD marked as bad data, the controller 150 will respond to the host entity that the data segment is the bad data. In another embodiment, after the data segment is marked as bad data, if the data segment has another backup data stored in another external storage virtualization system, the host entity can read out the backup data and rewrite the backup data into the data segment so as to correct the bad data.

In step 550, the controller 150 determines if it needs to issue a read/write request to the PSD 110 before the completion of the control program update of the PSD 110. If the result is yes, step 552 is performed; and if the result is no, step 560 is performed.

In step 552, the controller 150 determines if the read/write request needs to be issued to the PSD 110 is a read request. If the result is yes, step 554 is performed; and if the result is no, it means that the read/write request needs to be issued to the PSD 110 is a write request, and step 556 is performed.

In step 554, the read/write request needs to be issued to the PSD 110 by the controller 150 is a read request, and the data corresponding to the read request is stored in a data segment of the PSD 110 which is performing the control program update. Since the PSD 110 is off-line to perform the control program update at this moment, no matter when the data segment is an unmodified data segment or a modified data segment, the data in the PSD 110 cannot be read out, but the data in other PSDs 110 which are not performing the control program update or partial rebuilding can be normally read out. The controller 150 uses the data (including parity data) in the data segments of other PSDs having the same data segment number in order to execute a parity computation to regenerate the data in the data segment of the PSD 110 having aforesaid same data segment number (also referred as a computation using redundant data), and the computation result is sent out. After completion of step 554, the flow process jumps back to step 540.

In step 556, the controller 150 determines if the data segment in the PSD 110 corresponding to the write request is a modified data segment. The determination of the modified data segment is to check if the modified data segment number of the PSD is recorded in the modified data segment table. If the result is no, step 558 is performed. If the result is yes, it means that the data segment in the PSD 110 corresponding to the write request is a modified data segment, and the data in the data segment having the modified data segment number are modified data. At this moment, although the write data of the write request, in which the write data correspond to the data segment cannot be directly written into the data segment, the modified data segment number has ever been recorded in the modified data segment table, so that the modified data segment number of the PSD 110 does not need to be recorded again, and thus the original records is maintained and the flow process jumps back to step 540.

In step 558, since the data segment in the PSD 110 corresponding to the write request is originally an unmodified data segment, the controller 150 records a data segment number of the PSD 110 corresponding to the write request, into the modified data segment table, which means that the data in the data segment of the PSD 110 with the data segment number need to be updated and cannot be read out for use under the current situation. After completion of step 558, the flow process jumps back to step 540 again.

In steps 556 and 558, the controller 150 executes a computation with respect to the data of the write request, so as to generate new parity data to replace the original parity data. Therefore, when a data segment number is recorded in a modified data segment table, it means that the parity data segment corresponding to the data segment has been changed. Since data cannot be directly written into the data segment, the controller 150 merely can first make a record. When the PSD 110 performs partial rebuilding, data rebuilding in the data segment is performed according to the record.

In step 560, the controller 150 determines if the PSD 110 has completed the control program update. If the result is yes, step 570 is performed; and if the result is no, the flow process jumps back to step 540. When the PSD 110 is in the period of the control program update, the controller 150 will repeat steps 540 to 560 back and forth until completion of the control program update.

When the PSD 110 is in the period of the control program update, and the controller 150 needs to issue a write request to the PSD 110, it means that a portion of data segments in the PSD 100 needs to be updated; in other words, the data segments have stored incorrect data (modified data) therein, and thus the modified segments have to be modified by performing partial rebuilding so as to be recovered as correct data. The timing for performing the partial rebuilding of the PSD 100 is after completion of the control program update of the PSD 110.

In step 570, the controller 150 determines if there is any data segment number of the PSD 110 recorded in the modified data segment table. If the result is no, it means that the PSD 110 is in the period of the control program update and the controller 150 does not need to issue a write request to the PSD 110, so that no data segment number of the PSD 110 is recorded in the modified data segment table, and step 640 in FIG. 8 is performed. If the result is yes, it means that the PSD 110 is in the period of the control program update and the controller 150 needs to issue a write request to the PSD 110, so that the data in the modified data segment of the PSD 110 need to be updated, and thus the modified data segment in the PSD 110 with the data segment number that is recorded in the modified data segment table needs performing partial rebuilding, and step 580 is FIG. 7 is performed.

When the PSD 110 has completed the control program update but has not completed its partial rebuilding yet, although the PSD 110 is not recovered to be on-line, the controller 150 still can directly issue a read or write request to the unmodified data segment in the PSD 110, thereby performing the procedure of read or write request on the PSD 110, thus enhancing the system performance.

Figure 7:
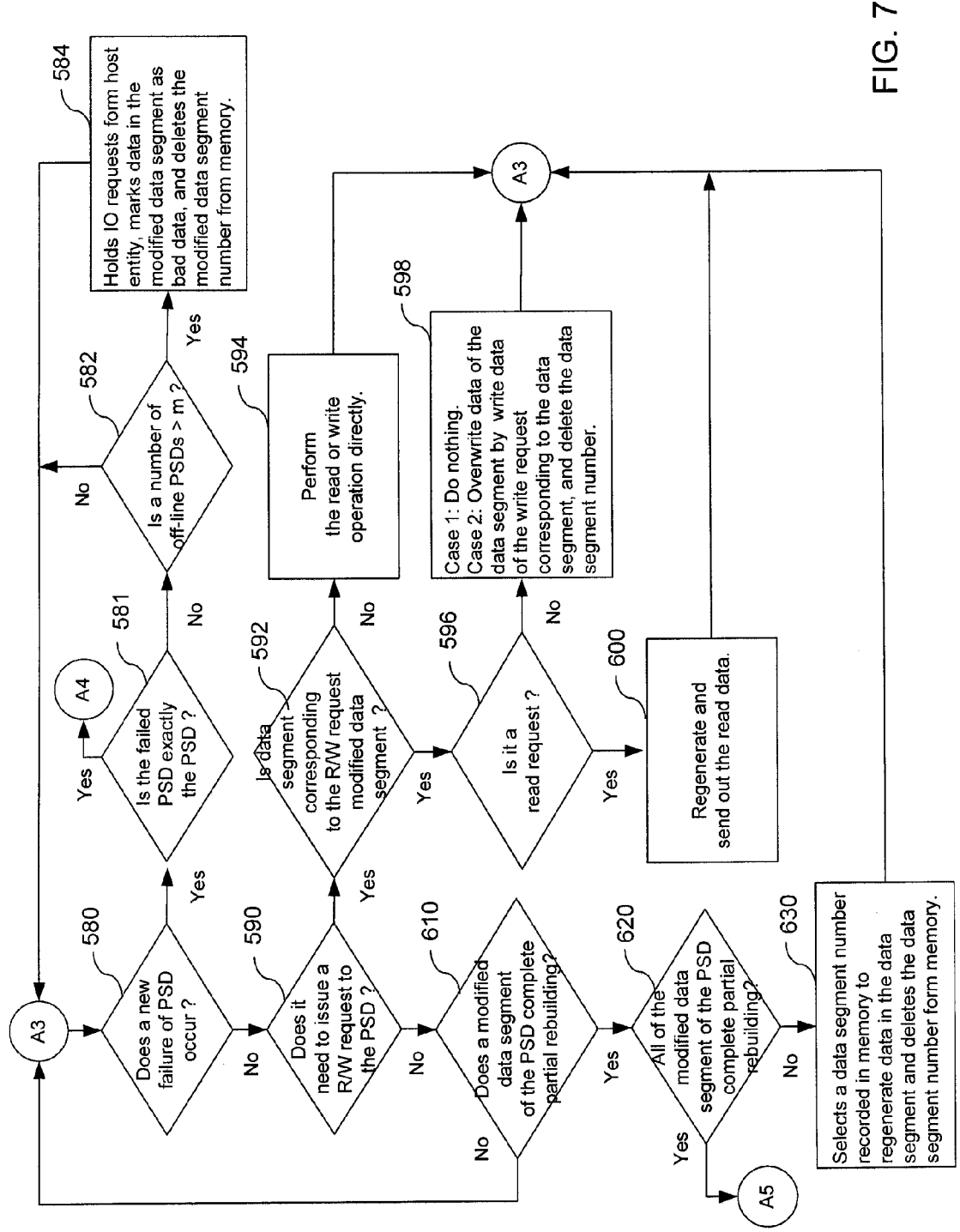

When the write or read request from the host entity needs to access data in the off-line PSD 110 which is performing partial rebuilding, step 580 in FIG. 7 is performed.

FIG. 7 is a flow chart followed after FIG. 6. In step 580, the controller 150 detects if there occurs a new failure of PSD in the storage virtualization system when the PSD 110 is in the period of the partial rebuilding. If the result is no, step 590 is performed, and if the result is yes, step 581 is performed.

In step 581, the controller 150 determines if the failed PSD is the PSD which is performing the partial building. If the result is yes, the flow process jumps to step 650 and ends the PSD control program update mode A. If the result is no, step 582 is performed. While the determination of step 581 is being performed, the related data of the failed PSD is recorded at the same time by the controller 150, and if the modified data segment number of the failed PSD has been recorded in the modified data segment table, the controller 150 will delete all of the data segment number of the failed PSD from the modified data segment table.

In step 582, the controller 150 determines if the total number of the off-line PSDs in the system is greater than the number m of the parity PSDs. If the result is yes, step 584 is performed; and if the result is no, step 580 is performed.

According to one embodiment, when the total number of the failed PSDs, the off-line PSDs which are performing the control program update, and the off-line PSDs which are performing partial rebuilding are smaller than or equal to the number m of the parity PSDs, the controller 150 may continue to receive IO requests from the host entity, so that the flow process directly jumps back to step 580. According to another embodiment, the total number of the failed PSDs, the off-line PSDs which are performing the control program update, and the off-line PSDs which are performing partial rebuilding are equal to the number m of the parity PSDs, the system is at a critical point for tolerating the maximum amount of failed PSDs. Although the system at the critical point will not lose data, in order to reduce the system risk, the controller 150 will temporarily stop receiving IO requests from the host entity. After the PSD has performed step 640, the controller 150 will recover to receive IO requests from the host entity and accept performing the control program update for other PSDs again.

In the aforementioned step 582, RAID 6 having two parity PSDs in storage virtualization system is taken for an example. When one PSD in the system is performing the partial rebuilding, the system can tolerate another one PSD which is failed or tolerate another one PSD which is performing partial rebuilding, without causing partial data loss. In case the system has already had one PSD which is performing the partial rebuilding, and there are two or more PSDs which are failed, the system will lose partial data. In case the system has already had one PSD which is performing partial rebuilding, there is another one PSD which is performing the control program update; and there is another one PSD which is failed, again, the system will lose partial data.

In step 584, since there already exists the failed PSD, the total number of the off-line PSDs in the storage virtualization system has exceeded the maximum limit of the off-line PSDs tolerable by the storage virtualization system, so that partial data loss occurs in the system, and the storage virtualization system cannot be normally operated any more. Therefore, in one embodiment, the controller 150 stops receiving IO requests from the host entity 10, and at this moment, the PSD which is performing partial building merely needs to finish the partial building of the modified data segment that is being partially rebuilt, and does not need to perform partial rebuilding on other modified data segments. The controller 150 will mark the data in a modified data segment of the PSD as bad data, and if the modified data segment number of the PSD has been recorded in the modified data segment table, the controller 150 will delete all the data segment number of the PSD from the modified data segment table. In another embodiment, after a data segment is marked as bad data, if the data segment has another backup data stored in another external storage virtualization system, the host entity can read out the backup data and rewrite the backup data into the data segment to correct the bad data. After completion of step 584, the flow process jumps back to step 580 and after steps 580 to 620 have been performed, the PSD 110 is recovered to be on-line (step 640), and the procedures of the PSD control program update mode A is ended (step 650).

In step 590, the controller 150 determines if it needs to issue a read/write request to the PSD 110 when the PSD 110 is in the period of partial rebuilding. If the result is yes, step 592 is performed, and if the result is no, step 610 is performed.

In step 592, the controller 150 determines if the data segment corresponding to the read/write request needs to be issued to the PSD 110 is a modified data segment. If the result is no, step 594 is performed; and if the result is yes, step 596 is performed.

In step 594, it indicates that the data segment number of the PSD 110 is not recorded in the modified data segment table, meaning that the data in the data segment of the PSD 110 with the data segment number do not need to be updated when the PSD 110 is in the period of the control program update; or the data segment with the data segment number have completed the procedures of partial rebuilding. In other words, the data segment with the data segment number is an unmodified data segment, so that data can be directly read out from or written into the data segment of the PSD 110 with the data segment number. Therefore, the controller 150 may directly issue a read or write request to the PSD 110, so as to read out or write into the data in the data segment of the PSD 110 with the data segment number corresponding to the read or write request. While performing partial rebuilding the PSD 110, the controller 150 may issue the read or write request to the unmodified data segment in the PSD 110 without waiting for the PSD 110 to be recovered on-line, thereby directly performing the read or write procedure on the PSD 110, thus enhancing the system performance. After completion of step 594, the flow process jumps back to step 580.

In step 596, the controller 150 determines if the read/write request needs to be issued to the PSD 110 is a read request. If the result is yes, step 600 is performed; and if the result is no, it means that the read/write request needs to be issued to the PSD 110 is a write request, and step 598 is performed.

In step 598, the read/write request needs to be issued to the PSD 110 by the controller 150 is a write request, and a data segment in the PSD 110 corresponding to the write request is a modified data segment. According to a first embodiment, since a data segment number of the data segment in the PSD 110 has been recorded in the modified data segment table, the data segment number does not need to be recorded again, and the flow process may jump to step 580 directly. In step 598, according to a second embodiment, the controller 150 uses the write data of write request, in which the write data correspond to the modified data segment to directly overwrite the original data in the modified data segment, and then deletes the data segment number of the PSD from the modified data segment table, thus saving the time for partial rebuilding of the data segment with the data segment number. After completion of step 598, the flow process jumps back to step 580.

In step 600, the read/write request needs to be issued to the PSD 110 by the controller 150 is a read request, and the data corresponding to the read request is stored in a modified data segment of the PSD 110 which is performing partial rebuilding. Since the data in the modified data segment of the PSD 110 are incorrect and need to be updated, and the modified data segment has not completed the partial rebuilding yet, the data in the modified data segment cannot be directly read out, but the data in other PSDs 110 which are not performing partial rebuilding or which are not performing the control program update can be normally read out. The controller 150 uses the data (including parity data) in the data segments of other PSDs having the same data segment number to execute a parity computation to regenerate the data in the data segment of the PSD 110 having the same data segment number, and the computation result is sent out. After completion of step 600, the flow process jumps back to step 580.

In step 610, the controller 150 determines if a data segment of the PSD 110 which is performing partial rebuilding has completed the partial rebuilding. If the result is yes, step 620 is performed; and if the result is no, the flow process jumps back to step 580.

Since the controller 150 may need to issue a write request to a plurality of data segments of the PSD 110 during the period of the control program update of the PSD 110, which results in the fact that the plurality of data segments of the PSD 110 may become modified data segments, and thus all of the modified data segments of the PSD 110 need to perform partial rebuilding. In step 620, the controller 150 determines if all of the modified data segments have completed the partial rebuilding, i.e., determines if the modified data segment table already has no records of data segment number of the PSD 110. If the result is yes, step 640 in FIG. 8 is performed; and if the result is no, step 630 is performed.

In step 630, the controller 150 performs the partial rebuilding of the PSD 110 based on the records of data segment number in the modified data segment table, so as to rebuild the data in the modified data segments of the PSD 110. While performing the partial rebuilding, the controller 150 first selects a data segment number of the PSD 110 based on the records in the modified data segment table, and then uses the data (including parity data) in the data segments of the PSD 110 having the same data segment number to regenerate the data in the data segment of the PSD 110 with the same data segment number, and writes the regenerated data back into the data segment with the same data segment number of the PSD, then the controller 150 deletes the data segment number of the PSD 110 from the modified data segment table, thereby completing the partial rebuilding of a modified data segment of the PSD 110. When the PSD 110 is in the period of partial rebuilding, the controller 150 will repeat steps 580 to 630 back and forth until all of the data segment numbers of the PSD 110 in the modified data segment table are deleted.

In step 640 of FIG. 8, the controller 150 resets the PSD 110 to an on-line state for reentering a normal operation mode. Certainly, the controller 150 is recovered to issue a read/write request to the PSD 110 normally, and meanwhile, the on-line/off-line record of the PSD 110 is changed from an off-line state to the on-line state by the controller 150.

After the completion of step 640, step 650 is performed to end the PSD control program update mode A. If there exists another PSD 100 that needs the control program update, step 500 is performed again.

FIG. 9 to FIG. 12 show a flow process of the PSD control program update mode B in detail. The PSD control program update mode B starts at step 700 in FIG. 9. In step 710, the controller 150 selects number n of PSDs 110 waiting for updating their control programs in the PSD array 100, so as to update the control programs 112 of PSD. In one embodiment, when no failure of PSD occurs in the system, the number n of the PSDs selected for updating their control programs is not greater than the number m of the parity PSDs, and the relationship between n and m is: $1 \leq n \leq m$. In another embodiment, if there occurs number f of failed PSDs, the maximum value of n is limited to m−f, wherein the relationship among n, f, and m is: $1 \leq n \leq m-f$, where m, n and f are positive integers.

In the PSD control program update mode B, the controller 150 performs a series of procedures on each selected PSD to be updated with its control program, the procedures including steps 720 to 850 shown in FIG. 9 to FIG. 12. Each PSD is performed its series of procedures based on the actual situations, i.e. the series of procedures performed on the respective PSDs are independent, which can be performed at the same time (parallel processing) or one after another.

In step 720, the controller 150 sets the selected PSD 110 waiting for updating its control program 112, to an off-line state. The details of this step can be referred to the related description of step 520.

In step 730, the controller 150 performs update the control program 112 of the selected PSD 110. The details of this step can be referred to the related description of step 530.

The aforementioned three steps 710, 720 and 730 are detailed processing steps of step 320 shown in FIG. 3.

When the controller 150 receives a write request issued from the host entity 10 to PSD, the control 150 needs to perform a computation through using the data corresponding to the write request, so as to generate new parity data to replace the original parity data.

Figure 10:
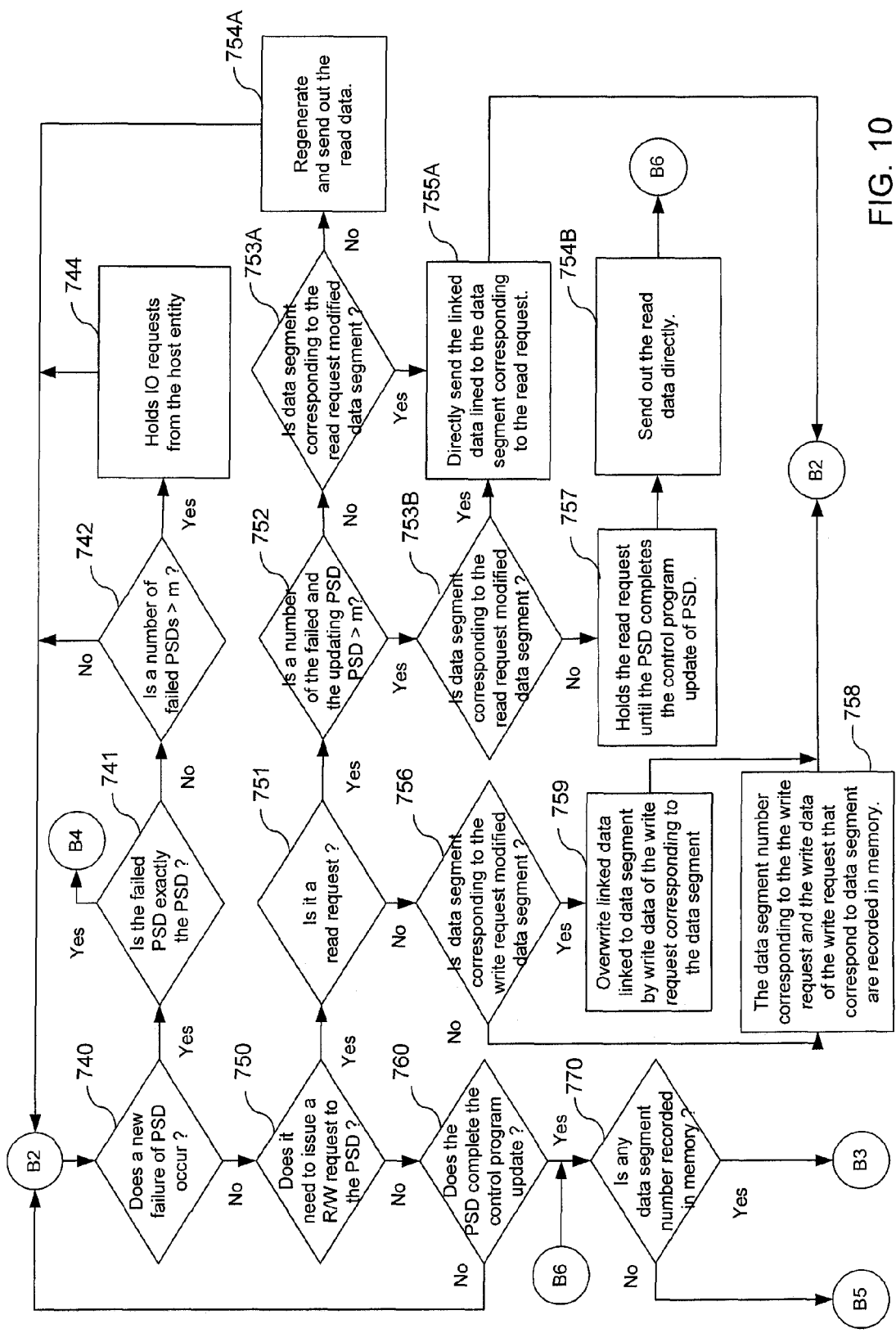

When a read or write request issued from the host entity is desired to access the data in the PSD 110 which is in off-line state for performing the control program update, step 740 in FIG. 10 is performed.

Figures 9, 12:
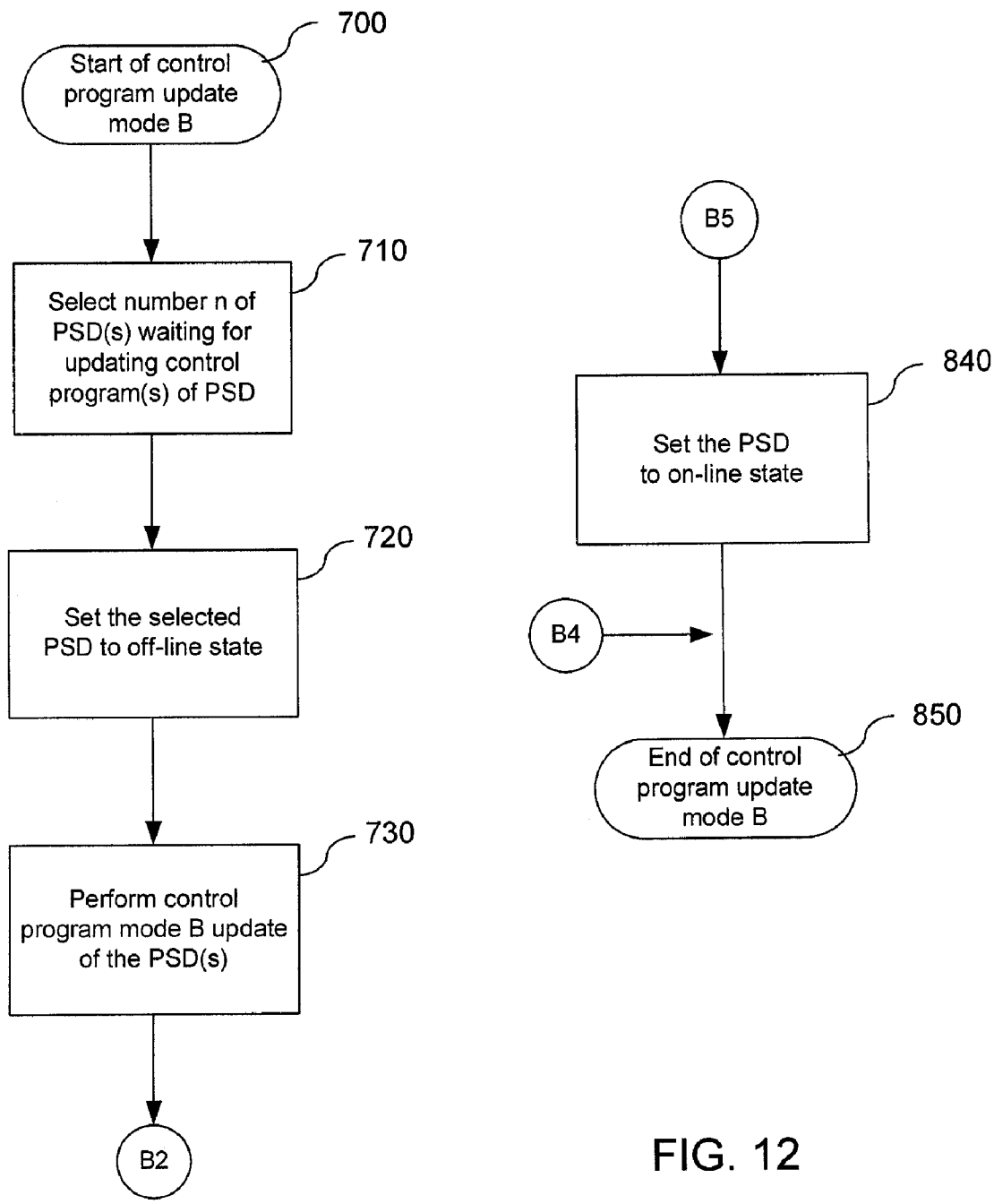
FIG. 9 through FIG. 12 are detailed flow charts of a PSD control program update mode B according to an embodiment of the present invention.

FIG. 10 is a flow chart followed after FIG. 9. In step 740, the controller 150 detects if there occurs a new failure of PSD in the storage virtualization system when the PSD 110 is in the period of the control program update. If the result is no, step 750 is performed; and if the result is yes, step 741 is performed. As to the situation of the new failure of PSD, please refer to the related description of step 540.

In step 741, the controller 150 determines if the failed PSD is a PSD which is performing the control program update. If the result is yes, step 850 is performed to end the PSD control program update mode B. If the result is no, step 742 is performed. While the determination of step 741 is being performed, the related data of the failed PSD is recorded at the same time by the controller 150, and if the modified data segment number of the failed PSD has been recorded in the modified data segment table, the controller 150 will delete all of the data segment number of the failed PSD from the modified data segment table.

In step 742, the controller 150 determines if the total number of the failed PSDs in the system is greater than the number m of the parity PSDs. If the result is yes, step 744 is performed, and if the result is no, step 740 is performed.

In the embodiment of the present invention, if the number of the parity PSDs in the system is m under the PSD control program update mode B in the period of the PSD control program update or partial rebuilding, then the total number of the failed PSDs of the PSD array 100 in the period of control program update or of partial rebuilding that can be tolerable by the system is m. This embodiment particularly indicates that the total number of the failed PSDs but not the off-line PSDs is m, the reasons of which is described below. When the controller 150 needs to issue a write request to the PSD 110, in addition to recording, by the controller 150, the data segment number of the PSD 110 corresponding to the write request, into the modified data segment table, the controller 150 also needs to store the write data of the write request, in which the write data correspond to the data segment of the PSD 110, into the second memory 182 at the same time, wherein data segment number(s) of the PSD in the modified data segment table is (are) linked to the write data (linked data) stored in the second memory 182. At this moment, although the PSD 110 is in off-line state, the modified data segment has the linked data. Thus, in the period of the PSD control program update, when the controller 150 needs to issue a read request to the modified data segment in the PSD 110, the read request can be performed without needing to regenerate read data but through reading out the linked data of the modified data segment; and, when the controller 150 is desired to issue a write request to the modified data segment in the PSD 110, the write data of the write request, in which the write data correspond to the modified data segment directly overwrite the original linked data linked to the modified data segment. Therefore, the PSD control program update mode B has better fault-tolerant capability than that of the PSD control program update mode A. If the total number of the failed PSD is greater than m, partial data loss occurs in the storage virtualization system, and the system cannot be normally operated any more; and If the total number of the failed PSD is not greater than m, the system can be operated continuously.

In step 742, according to one embodiment, when the total number of the failed PSDs is smaller than or equal to the number m of the parity PSDs, the controller 150 may continue to receive IO requests from the host entity without losing data, and other procedures can be performed continuously, so that the flow process directly jumps back to step 740. In step 742, according to another embodiment, if the total number of the failed PSDs is equal to the number m of the parity PSDs, the system is at a critical point for tolerating the maximum amount of failed PSDs. Although the system at the critical point would not lose data, in order to reduce the system risk, the controller 150 will temporarily stop receiving IO requests from the host entity. After the PSD has performed step 840, the controller 150 will recover to receive IO requests from the host entity and accept performing the control program update of other PSDs.

In the aforementioned step 742, a RAID 6 having two parity PSDs in storage virtualization system is taken for an example. When the system is performing the control program update, the system can tolerate another two PSDs which are failed without causing partial data loss. After the failed PSD is replaced by a new PSD, the original data in the failed PSD can be rebuilt. In case the system has already had one PSD which is performing the control program update; and there are two or more PSDs which are failed, the system will lose partial data.

In step 744, since there has already existed the failed PSD, the total number of the failed PSDs in the storage virtualization system has exceeded the maximum limit of the failed PSDs tolerable by the storage virtualization system, partial data loss occurs in the storage virtualization system, and the system cannot be normally operated any more. Therefore, in one embodiment, the controller 150 stops receiving IO requests from the host entity 10, and at this moment, the PSD which is performing the control program update may continuously perform the control program update till completion of the control program update, and also may perform partial rebuilding until the completion thereof. Since the modified data segment in the PSD is linked to the linked data, when the PSD is in the period of partial rebuilding, the linked data can be duplicated to the corresponding modified data segment to perform partial rebuilding of the modified data segment. Further, since the modified data segment in the PSD can be rebuilt, the controller 150 will not mark the data in a modified data segment of the PSD as bad data; and if the modified data segment number of the PSD has been recorded in the modified data segment table, the controller 150 will not delete all of the data segment number of the PSD from the modified data segment table. It is noted that: although the PSD may be able to continue the procedure of the partial rebuilding, the system has already lost data at that moment, and after the PSD is recovered on-line state by the controller 150, the system will not immediately accept the command to perform the control program update on another PSD After completion of step 744, the flow process jumps back to step 740. After steps 740 to 830 have been performed, the PSD 110 is recovered on-line (step 840), and the procedures of the PSD control program update mode B is ended (step 850).

In step 750, the controller 150 determines if it needs to issue a read/write request to the PSD 110 before completion of the control program update of the PSD 110. If the result is yes, step 751 is performed; and if the result is no, step 760 is performed.

In step 751, the controller 150 determines if the read/write request needs to be issued to the PSD 110 is a read request. If the result is yes, step 752 is performed; and if the result is no, it means that the read/write request needs to be issued to the PSD 110 is a write request, and step 756 is performed.

In step 752, the controller 150 determines if the total number of the PSDs which are performing the control program update and which are the failed PSDs, is greater than m. If the result of step 752 is yes, when the controller 150 receives the read request issued from the host entity to the unmodified data segment in the PSD which is performing the control program update, the controller 150 cannot regenerate the read data of the unmodified data segment, and also cannot respond to the host entity promptly, and thus step 753B is performed; If the result of step 752 is no, step 753A is performed.

In step 753A, the controller 150 determines if the data segment in the PSD corresponding to the read request is a modified data segment. If the result is yes, step 755A is performed; and if the result is no, step 754A is performed.

In step 754A, the read/write request needs to be issued to the PSD 110 by the controller 150 is a read request, and the data corresponding to the read request are stored in an unmodified data segment of the PSD 110 which is performing the control program update. Since the PSD is in an off-line state and is performing the control program update, the data in the PSD 110 cannot be directly read out, and the data in other PSDs 110 which are not performing the control program update and the data in other PSDs 110 which are performing partial rebuilding can be normally read out. The controller 150 uses the data (including parity data) in the data segments of other PSDs having the same data segment number to execute a parity computation to regenerate the data in the data segment of the PSD 110 having the same data segment number, and the computation result is sent out. After completion of step 754A, the flow process jumps back to step 740.

In step 755A, the read/write request needs to be issued to the PSD 110 by the controller 150 is a read request, and the data corresponding to the read request are stored in a modified data segment of the PSD 110 which is performing the control program update. The controller 150 directly sends out the linked data linked to the modified data segment. After completion of step 755A, the flow process jumps back to step 740.

In step 753B, the controller 150 determines if the data segment in the PSD corresponding to the read request is a modified data segment. If the result is yes, step 755A is performed; and if the result is no, step 757 is performed.

In step 757, the controller 150 first temporarily stops responding to the read request from the host entity until completion of the control program update of the PSD 110 which was performing the control program update. Under the situation that the total number of the failed PSDs and the PSDs which are performing the control program update is greater than m, to the PSDs 110 which are performing the control program update, if the controller 150 receives the read request issued from the host entity responding to the unmodified data segment in the PSD 110 at this moment, the controller 150 cannot use the data (including parity data) in the data segments of other PSDs having the same data segment number to execute a parity computation to regenerate the data in the unmodified data segment of the PSD 110 having the same data segment number; therefore, the controller 150 will temporarily stop responding to the read request from the host entity until completion of the control program update of the PSD 110. After completion of step 757, step 754B is performed.

In step 754B, the controller 150 directly sends out the data in the data segment in the PSD 110 corresponding to the read request. A this moment, because the control program update has been completed, and the data segment corresponding to the read request is an unmodified data segment, the controller 150 may directly sent out the data in the data segment in the PSD 110. After completion of step 754B, the flow process jumps to step 770.

In the aforementioned step 754B, since the PSD 110 has completed the control program update, the flow process will not jump back to the determination procedure of step 740. When the PSD has not completed the control program update yet, the controller 150 will repeat steps 740 to 760 back and forth until completion of the control program update of the PSD 110.

In step 756, the controller 150 determines if the data segment in the PSD corresponding to the write request is a modified data segment. If the result is yes, step 759 is performed; and if the result is no, step 758 is performed.

In step 758, the data segment in the PSD 110 corresponding to the write request is an unmodified data segment. The controller 150 records the data segment number of the PSD 110 corresponding to the write request, into the modified data segment table, meaning that the data in the data segment with the data segment number need to be updated and cannot be read out for use under the current situation. In addition to recording the data segment number of the PSD 110 into the modified data segment table, the controller 150 also stores the write data of the write request, in which the write data correspond to the data segment of the number of PSD 110, into the second memory 182 at the same time. After completion of step 758, the flow process jumps to step 740.

In step 759, the data segment in the PSD 110 corresponding to the write request is a modified data segment. Since a data segment number of the data segment in the PSD 110 has been recorded in the modified data segment table, the data segment number does not need to be recorded again, but the original linked data linked to the data segment number has to be overwritten by the write data of the write request, in which the write data correspond to the data segment of of PSD 110. After the completion of step 759, the flow process jumps to step 740.

In steps 758 and 759, when the data segment number is recorded in the modified data segment table, aforesaid record will be used to rebuild the data in the data segment when the procedure of partial rebuilding is performed.

In step 760, the controller 150 determines if the PSD 110 has completed the control program update. If the result is yes, step 770 is performed; and if the result is no, the flow process jumps back to step 740. When the PSD is in the period of the control program update, the controller 150 will repeat steps 740 to 760 back and forth until completion of the control program update of the PSD 110.

In step 770, the controller 150 determines if there is any data segment number of the PSD 110 recorded in the modified data segment table. If the result is no, it means that the PSD 110 is in the period of the control program update and the controller 150 does not need to issue a write request to the PSD 110, so that no data segment number of the PSD 110 is recorded in the modified data segment table, and step 840 in FIG. 12 is performed. If the result is yes, it means that the PSD 110 is in the period of the control program update and the controller 150 needs to issue a write request to the PSD 110, so that the data in the modified data segment of the PSD 110 need to be updated, and thus the modified data segment in the PSD 110 with the data segment number recorded in the modified data segment table needs performing partial rebuilding, and step 780 is FIG. 11 is performed.

When the PSD 110 has completed the control program update but has not completed its partial rebuilding yet, although the PSD 110 is not recovered to be on-line, the controller 150 still can directly issue a read or write request to the unmodified data segment in the PSD 110, thereby performing the procedure of read or write request on the PSD 110, thus enhancing the system performance.

Figure 11:
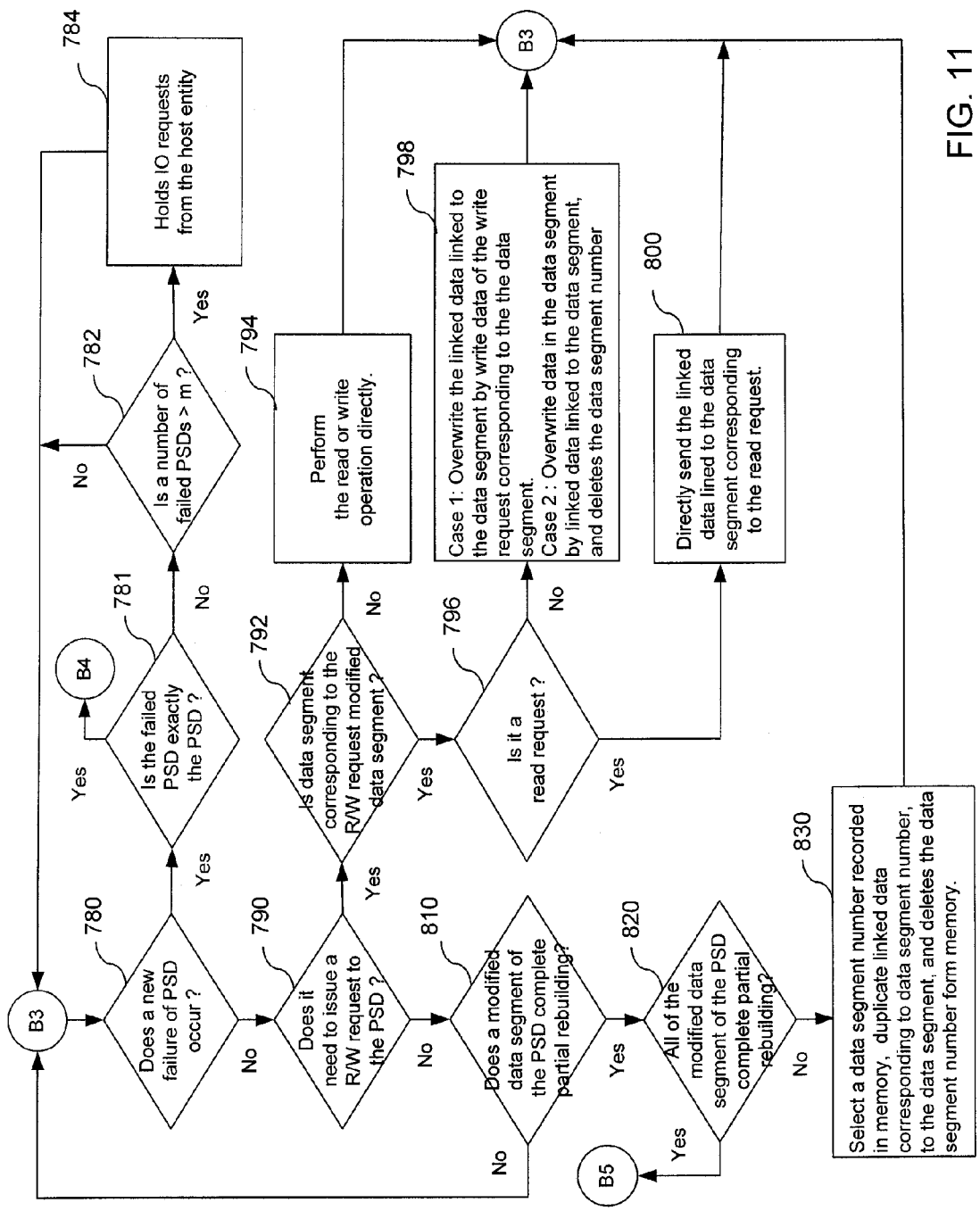

When the write or read request from the host entity is desired to access data in the off-line PSD 110 which is performing partial rebuilding, step 780 in FIG. 11 is performed.

FIG. 11 is a flow chart followed after FIG. 10. In step 780, the controller 150 detects if there occurs a new failure of PSD in the storage virtualization system when the PSD 110 is in the period of the partial rebuilding. If the result is no, step 790 is performed; and if the result is yes, step 781 is performed.

In step 781, the controller 150 determines if the failed PSD is a PSD which is performing partial building. If the result is yes, the flow process jumps to step 850 and ends the PSD control program update mode B. If the result is no, step 782 is performed. While the determination of step 781 is being performed, the related data of the failed PSD is recorded at the same time, and if the modified data segment number of the failed PSD has been recorded in the modified data segment table, the controller 150 will delete all of the data segment number of the failed PSD from the modified data segment table.

In step 782, the controller 150 determines if the total number of the failed PSDs in the system is greater than the number m of the parity PSDs. If the result is yes, step 784 is performed; and if the result is no, step 780 is performed.

According to one embodiment, when the total number of the failed PSDs is smaller than or equal to the number m of the parity PSDs, the controller 150 may continue to receive IO requests from the host entity, so that the flow process directly jumps back to step 780. According to another embodiment, the total number of the failed PSDs is equal to the number m of the parity PSDs, the system is at a critical point for tolerating the maximum amount of failed PSDs. Although the system at the critical point will not lose data, in order to reduce the system risk, the controller 150 will temporarily stop receiving IO requests from the host entity. After the PSD has performed step 840, the controller 150 will recover to receive IO requests from the host entity and accept performing the control program update for other PSDs again.

In the aforementioned step 782, RAID 6 having two parity PSDs in storage virtualization system is used as an example. When the system is performing partial rebuilding, the system can tolerate another two PSDs which are failed without causing partial data loss. After the failed PSD is replaced by a new PSD, the original data in the failed PSD can be rebuilt. In case there are three or more PSDs which are failed in the system, the system will lose partial data.

In step 784, since there has already existed the failed PSD, the total number of the failed PSDs in the storage virtualization system has exceeded the maximum limit of the failed PSDs tolerable by the storage virtualization system, so that partial data loss occurs in the system, and the storage virtualization system cannot be normally operated any more. Therefore, in one embodiment, the controller 150 stops receiving IO requests from the host entity 10, and at this moment, the PSD which is performing partial building may continue to perform the partial rebuilding until completion of the partial rebuilding of the PSD 110. Since a modified data segment in the PSD 110 is linked to linked data, when the PSD is in the period of partial rebuilding, the linked data can be duplicated to the corresponding modified data segment to perform the partial rebuilding of the modified data segment. Further, since the modified data segment in the PSD can be rebuilt, the controller 150 will not mark the modified data segment in the PSD as bad data; and if the modified data segment number of the PSD has been recorded in the modified data segment table, the controller 150 will not delete all of the data segment number of the PSD from the modified data segment table. It is noted that: although the PSD may be able to continue the procedure of the partial rebuilding, the system already has the occurrence of data loss at this moment, the system will not immediately accept the command to perform the control program update on another PSD after the PSD is recovered on-line state by the controller 150. After completion of step 784, the flow process jumps back to step 780, and after steps 780 to 830 have been determined and/or performed, the PSD 110 is recovered on-line (step 840), and the procedures of the PSD control program update mode B is ended (step 850).

In step 790, the controller 150 determines if it needs to issue a read/write request to the PSD 110 before completion of the control program update of the PSD 110. If the result is yes, step 792 is performed; and if the result is no, step 810 is performed.

In step 792, the controller 150 determines if the data segment corresponding to the read/write request needs to be issued to the PSD 110 is a modified data segment. If the result is no, step 794 is performed; and if the result is yes, step 796 is performed.

In step 794, it indicates that the data segment number of the PSD 110 is not recorded in the modified data segment table, meaning that either the data in the data segment of the PSD 110 with the data segment number do not need to be updated when the PSD 110 is in the period of the control program update, or the data segment with the data segment number have completed the procedures of partial rebuilding. In other words, the data segment with the data segment number is an unmodified data segment, so that data can be directly read out from or written into the data segment of the PSD 110 with the data segment number. Therefore, the controller 150 may directly issue a read or write request to the PSD 110, so as to read out or write into the data in the data segment of the PSD 110 with the data segment number corresponding to the read or write request. While performing partial rebuilding the PSD 110, the controller 150 may issue the read or write request to the unmodified data segment in the PSD 110 without waiting for the PSD 110 to be recovered on-line, thereby directly performing read or write procedures on the PSD 110, thus enhancing the system performance. After completion of step 794, the flow process jumps back to step 780.

In step 796, the controller 150 determines if the read/write request needs to be issued to the PSD 110 is a read request. If the result is yes, step 800 is performed; and if the result is no, it means that the read/write request needs to be issued to the PSD 110 is a write request, and step 798 is performed.

In step 798, the read/write request needs to be issued to the PSD 110 by the controller 150 is a write request, and a data segment in the PSD 110 corresponding to the write request is a modified data segment. According to a first embodiment, since a data segment number of the data segment in the PSD 110 has been recorded in the modified data segment table, the data segment number does not need to be recorded again, but the original linked data linked to data segment number need overwriting by write data of the write request, in which the write data correspond to the data segment. After completion of step 798, the flow process jumps back to step 780. In step 798, according to a second embodiment, the read/write request needs to be issued to the PSD 110 by the controller 150 is a write request, and the data of the PSD 110 with the data segment number corresponding to the write request are modified data, and the controller 150 uses the write data of the write request, in which the write data correspond to the data segment to directly overwrite the original data in the modified data segment, and then deletes the data segment number of the PSD from the modified data segment table, thus saving the time for partial rebuilding of the data segment with the data segment number. After completion of step 798, the flow process jumps back to step 780.

In step 800, when the read/write request needs to be issued to the PSD 110 by the controller 150 is a read request, and the data corresponding to the read request is stored in a modified data segment of the PSD 110 which is performing partial rebuilding, since the data in the modified data segment of the PSD 110 are incorrect and need to be updated and the modified data segment has not completed the partial rebuilding yet, the data in the modified data segment cannot be directly read out, but the controller 150 directly sends out the linked data linked to the data segment. After completion of step 800, the flow process jumps back to step 780.

In step 810, the controller 150 determines if data segment of the PSD 110 which is performing partial rebuilding has completed the partial rebuilding. If the result is yes, step 820 is performed; and if the result is no, the flow process jumps back to step 780.

Since the controller 150 may need to issue a write request to a plurality of data segments of the PSD 110 when being in the period of the control program update of the PSD 110, which causes that the plurality of data segments of the PSD 110 may become modified data segments, and thus all of the modified data segments of the PSD 110 need to perform partial rebuilding. In step 820, the controller 150 determines if all of the modified data segments have completed the partial rebuilding, i.e., determining if the modified data segment table does not have records of data segment number of the PSD 110. If the result is yes, step 840 in FIG. 12 is performed; and if the result is no, step 830 is performed.

In step 830, the controller 150 performs the partial rebuilding of the PSD 110 based on the records of data segment number in the modified data segment table, so as to rebuild the data in the modified data segments of the PSD 110. The controller 150 first selects a data segment number of the PSD 110 based on the records in the modified data segment table, and then duplicates the linked data linked to the data segment number in the modified data segment table, back to the data segment with the data segment number, and finally the controller 150 deletes the data segment number of the PSD 110 from the modified data segment table, thereby completing the procedure of the partial rebuilding of a modified data segment on the PSD 110. When the PSD 110 is in the period of partial rebuilding, the controller 150 will repeat steps 780 to 830 back and forth until all of the data segment numbers of the PSD 110 in the modified data segment table are deleted.

In step 840 of FIG. 12, the controller 150 resets the PSD 110 to an on-line state for reentering a normal operation mode. Certainly, the control 150 is recovered and can issue a read/write request to the PSD 110 normally, and meanwhile, the on-line/off-line record of the PSD 110 is changed to the on-line state from an off-line state by the controller 150.

After completion of step 840, step 850 is performed to end the PSD control program update mode B. If there exists another PSD 100 that needs the control program update, step 700 is performed again.

In the aforementioned PSD control program update mode A or B, although the modified data segment is processed and identified by using a method that records the data segment number, in actual operations, it is not limited to the method that records the data segment number, and any method can be used as long as the method can mark the modified data segment and determine that the data segment is the modified data segment. For example, the method records an attribute of each data segment, and the attribute of the modified data segment is different from that of a common data segment, such the representation of True/False or 1/0 which can be used to clearly distinguish the modified data segment from the common data segments.

In another embodiment, a method for updating a control program of a PSD in a storage virtualization system is provided, and the method comprises the following steps of: providing a plurality of sets of parity data chunks in the same data stripe for checking user data; selecting one or more PSD(s) need(s) to update one or more control program(s) thereof; making the selected PSD(s) enter an off-line state; and updating the control program of the selected PSD(s), wherein if it needs to issue a write request to the selected PSD(s) before completion of the control program update, an unmodified data segment in the PSD corresponding the write request is marked as a modified data segment, thereby simultaneously updating the control program(s) of the selected PSD(s) in the storage virtualization system; or when there is a failed PSD in the storage virtualization system, the control program update of the PSD still can be performed, thereby accelerating the control program update of the PSD and improving system performance. For example, when there are two sets of parity data chunks existing in a data stripe, two PSDs may perform the control program update at the same time, or when there is one failed PSD occurring, the other PSD may still be able to perform the control program update at the same time. Further, for example, when there are three sets of parity data chunks in a data stripe, three PSDs may perform the control program update at the same time, or, wherein there are two failed PSDs occurring, another PSD may still be able to perform the control program update at the same time, or, wherein there are one failed PSD occurring, another two PSDs may still be able to perform the control program update at the same time.

Moreover, according to a further embodiment of the present invention, under a situation of providing a plurality of sets of parity data chunks in the same data stripe for checking user data, after the completion of update the control program of the selected PSD, the following steps are further performed: performing partial rebuilding after the selected PSD completes the control program update, wherein before the completion of the partial rebuilding, if it needs to issue a read or write request to an unmodified data segment in the PSD, the read or write request is issued to the PSD directly without waiting for the completion of partial rebuilding of all the modified data segments.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for updating a control program of a physical storage device (PSD) in a storage virtualization system, comprising the steps of:
    selecting at least one PSD to be updated with a control program thereof;
    making the selected PSD enter an off-line state;
    updating the control program of the selected PSD, wherein if it needs to issue a write request to the selected PSD before completion of the control program update, an unmodified data segment corresponding to the write request is marked as a modified data segment; and
    performing a partial rebuilding on the at least one selected PSD after completion of the control program update, wherein if it needs to read data out from or write data into the unmodified data segment of the selected PSD before completion of the partial rebuilding, a read or write request is issued to the selected PSD directly without waiting for completion of the partial rebuilding of all the modified data segments in the selected PSD.

2. The method as claimed in claim 1, wherein if it needs to read the data out from a data segment of the selected PSD when the selected PSD is in a period of the control program update, redundant data of the data segment is used for computing the read data, and the read data is sent out.

3. The method as claimed in claim 1, wherein if it needs to write data into the modified data segment of the selected PSD, when the selected PSD is in a period of the control program update, the marking of the modified data segment remains unchanged.

4. The method as claimed in claim 1, wherein the partial rebuilding comprises the steps of:
    (a) selecting the modified data segment, using redundant data of the modified data segment for computation to obtain new data of the modified data segment, overwriting the modified data segment by the new data, and canceling the marking of the modified data segment; and
    (b) repeating step (a) until no modified data segment is existed in the selected PSD.

5. The method as claimed in claim 1, wherein if it needs to read the data out from a modified data segment of the selected PSD when the selected PSD is in a period of the partial rebuilding, redundant data of the modified data segment is used for computing the read data, and the read data is sent out.

6. The method as claimed in claim 1, wherein if it needs to write data into the modified data segment of the selected PSD when the selected PSD is in a period of the partial rebuilding, data in the modified data segment is overwritten by the write data corresponding to the modified data segment, and the marking of the modified data segment is canceled.

7. The method as claimed in claim 1, wherein if it needs to write the data into the modified data segment of the selected PSD when the selected PSD is in a period of the partial rebuilding, the marking of the modified data segment remains unchange.

8. The method as claimed in claim 1, wherein when there occurs a failure of PSD, and a total number of the off-line PSDs in the storage virtualization system is smaller than or equal to a number of parity PSDs, the control program update or the partial rebuilding of the selected PSD is continuously performed until the selected PSD completes the partial building.

9. The method as claimed in claim 1, wherein when there occurs a failure of PSD and a total number of off-line PSDs in the storage virtualization system is equal to a number of parity PSDs, read or write requests that access to the PSDs are temporarily stopped until the selected PSD completes the partial building.

10. The method as claimed in claim 1, wherein when there occurs a failure of PSD and a total number of off-line PSDs in the storage virtualization system is greater than a number of parity PSDs, the data on the modified data segment of the selected PSD is marked as bad data.

11. The method as claimed in claim 1, wherein when there occurs a failure of PSD, the failed PSD is performing the control program update or the partial rebuilding, if the failed PSD has the modified data segment, the marking of the modified data segment is cancelled.

12. The method as claimed in claim 1, wherein if a data linking status of the modified data segment is a status with linked data, the data corresponding to the write request issued to the selected PSD is stored in a memory and becomes a linked data.

13. The method as claimed in claim 12, wherein if it needs to read data out from a data segment of the selected PSD when the selected PSD is in a period of the control program update, redundant data of the data segment is used for computing the read data, and the read data is sent out.

14. The method as claimed in claim 12, wherein if it needs to read data out from the modified data segment of the selected PSD when the selected PSD is in a period of the control program update, the linked data of the modified data segment is directly sent out.

15. The method as claimed in claim 12, wherein if it needs to write data into the unmodified data segment of the selected PSD when the selected PSD is in a period of the control program update, the unmodified data segment is marked as the modified data segment, and the write data of the write request corresponding to the unmodified data segment is stored as the linked data.

16. The method as claimed in claim 12, wherein if it needs to write data into the modified data segment of the selected PSD when the selected PSD is in a period of the control program update, the marking of the modified data segment remains unchanged, and the original linked data linked to the modified data segment is directly overwritten by the write data of the write request corresponding to the modified data segment.

17. The method as claimed in claim 12, wherein the partial rebuilding comprises the steps of:
  (a) selecting the modified data segment, duplicating the linked data of the modified data segment to the modified data segment, and canceling the marking of the modified data segment; and
  (b) repeating step (a) until no the modified data segment exists in the selected PSD.

18. The method as claimed in claim 12, wherein if it needs to read data out from the modified data segment of the selected PSD when the selected PSD is in a period of the partial rebuilding, the linked data linked to the modified data segment is directly sent out.

19. The method as claimed in claim 12, wherein if it needs to write data into the modified data segment of the selected PSD when the selected PSD is in a period of the partial rebuilding, data in the modified data segment is directly overwritten by the write data of the the write request corresponding to the modified data segment, and the marking of the modified data segment is cancelled.

20. The method as claimed in claim 12, wherein if it needs to write data into the modified data segment of the selected PSD when the selected PSD is in a period of the partial rebuilding, the marking of the modified data segment remains unchanged, and a original linked data linked to the modified data segment is directly overwritten by the write data of the write request corresponding to the modified data segment.

21. The method as claimed in claim 12, wherein when there occurs a failure of PSD and a total number of the failed PSDs in the storage virtualization system is smaller than or equal to a number of parity PSDs, a data loss does not occur, and the control program update or the partial rebuilding of the selected PSD is continuously performed until the selected PSD completes the partial building.

22. The method as claimed in claim 12, wherein when there occurs a failure of PSD and a total number of the failed PSDs in the storage virtualization system is equal to a number of parity PSDs, read or write requests that access to the PSDs are temporarily stopped until the selected PSD completes the partial building.

23. The method as claimed in claim 12, wherein when there occurs a failure of PSD, a total number of the failed PSDs and a number of PSDs that are performing the control program update are greater than a number of parity PSDs, if it needs to issue the read request corresponding the unmodified data segment of the selected PSD, the read request that accesses to the PSD is temporarily stopped until completion of the PSD that are performing the control program update, then redundant data of the unmodified data segment is used for computation the read data, and the read data is sent out.

24. The method as claimed in claim 12, wherein when there occurs a failure of PSD and a total number of the failed PSDs in the storage virtualization system is greater than a number of parity PSDs, the linked data linked to the modified data segment is duplicated to the modified data segment.

25. The method as claimed in claim 12, wherein when there occurs a failure of PSD, the failed PSD is performing the control program update or the partial rebuilding, if the failed PSD has the modified data segment, the marking of the modified data segment is cancelled.

26. The method as claimed in claim 1, wherein the storage virtualization system comprises a plurality of PSDs, a first memory device and a second memory device, wherein each of the PSDs comprises a plurality of data segments and a programmable control program, the first memory device is used for storing the marking of the modified data segment, and the second memory is used for storing a linked data linked to the marking.

27. The method as claimed in claim 26, wherein the first memory device and the second memory device are located in a memory of a redundant array of independent disks (RAID) controller.

28. The method as claimed in claim 27, wherein each of the first memory device and the second memory device is a dynamic random access memory (DRAM) or a non-volatile memory (NVRAM).

29. The method as claimed in claim 28, wherein the NVRAM is a hard disk or SSD or a DRAM to which a battery or a supercapacitor supplies power.

30. The method as claimed in claim 1, wherein the storage virtualization system comprises a plurality of a plurality of PSDs, each of which comprises a plurality of data segments and a programmable control program.

31. The method as claimed in claim 30, wherein the size of each of the data segment in PSD is the size of a data chunk, a cache memory or a logical block.

32. The method as claimed in claim 1, wherein if there is a number N of PSDs in storage virtualization system, and N is a nature number, the control program update for the number N of the PSDs in the system can be simultaneously performed without interrupting read or write requests issued from a host entity to the number N of PSDs.

33. A storage virtualization controller for updating a control program of a PSD in a storage virtualization system, the storage virtualization controller comprising:
 a central processing circuitry (CPC);
 a host-side IO (input and output) device interconnect controller used to connect the CPC and at least one host entity for receiving an IO request from the at least one host entity; and
 a device-side IO device interconnect controller used to connect the CPC and a plurality of PSDs for executing IO operations of the PSDs in response to the IO request received from the at least one host entity, wherein at least one data stripe is provided in the PSDs, and at least one parity data chunk is provided in the same data stripe;
 wherein the CPC updates the control program of the PSDs by the following steps, comprising:
 selecting at least one PSD to be updated with a control program
 making the selected PSD enter an off-line state;
 updating the control program of the selected PSD, wherein if it needs to issue a write request to the selected PSD before completion of the control program update, an unmodified data segment corresponding to the write request is marked as a modified data segment; and
 performing a partial rebuilding on the selected PSD, after completion of the control program update, wherein if it needs to read data out from or write data into an unmodified data segment of the selected PSD before completion of the partial rebuilding, a read request or the write request is issued to the selected PSD directly without waiting for completion of the partial rebuilding of all the modified data segments in the selected PSD.

34. The storage virtualization controller as claimed in claim 33, wherein when there occurs a failure of PSD, and a total number of off-line PSDs in the storage virtualization system is smaller than or equal to a number of parity PSDs, the control program update or the partial rebuilding of the selected PSD is continuously performed until the selected PSD completes the partial building.

35. The storage virtualization controller as claimed in claim 33, wherein when there occurs a failure of PSD, and a total number of off-line PSDs in the storage virtualization system is equal to a number of parity PSDs, read or write requests that access to the PSDs are temporarily stopped until the selected PSD completes the partial building.

36. The storage virtualization controller as claimed in claim 33, wherein if there is a number N of PSDs in storage virtualization system, and the N is a nature number, the control program update for the number N of PSDs in the system can simultaneously be performed without interrupting read or write requests issued from a host entity to the number N of PSDs.

37. The storage virtualization controller as claimed in claim 33, wherein a linking status of the modified data segment is a linked data linked to the modified data segment, and when there occurs a failure of PSD and a total number of the failed PSDs in the storage virtualization system is smaller than or equal to a number of parity PSDs, a data loss will not occur, and the control program update or the partial rebuilding of the selected PSD is continuously performed until the selected PSD completes the partial building.

38. The storage virtualization controller as claimed in claim 33, wherein a linking status of the modified data segment is a linked data linked to the modified data segment, and when there occurs a failure of PSD and a total number of the failed PSDs in the storage virtualization system is equal to a number of parity PSDs, read or write requests that access to the PSDs are temporarily stopped until the selected PSD completes the partial building.

39. A storage virtualization system for updating a control program of a PSD in a storage virtualization system, the storage virtualization system comprising:
 a host entity for issuing an IO request;
 a storage virtualization controller coupled to the host entity for executing IO operations in response to the IO request; and
 a plurality of PSDs coupled to the storage virtualization controller for providing data storage space to the storage virtualization system, wherein at least one data stripe is provided in the plurality of PSDs, and at least one parity data chunks is provided in the same data stripe;
 wherein the storage virtualization controller updates the control program of the PSDs by the following steps, comprising:
 selecting at least one PSD to be updated with a control program therein;
 making the selected PSD enter an off-line state;
 updating the control program of the selected PSD, wherein if it needs to issue a write request to the selected PSD before completion of the control program update, an unmodified data segment corresponding to the write request is marked as a modified data segment; and
 performing a partial rebuilding on the selected PSD, after completion of the control program update, wherein if it needs to read data out from or write data into an unmodified data segment of the selected PSD before completion of the partial rebuilding, a read request or the write request is issued to the selected PSD directly without waiting for completion of the partial rebuilding of all the modified data segments in the selected PSD.

40. The storage virtualization system as claimed in claim 39, wherein when there occurs a failure of PSD and a total number of off-line PSDs in the storage virtualization system is smaller than or equal to a number of parity PSDs, the control program update or the partial rebuilding of the selected PSD is continuously performed until the selected PSD completes the partial building.

41. The storage virtualization system as claimed in claim 39, wherein when there occurs a failure of PSD and a total number of off-line PSDs in the storage virtualization system is equal to the number of parity PSDs, the read or write requests that access to the PSDs are temporarily stopped until the selected PSD completes the partial building.

42. The storage virtualization system as claimed in claim 39, wherein there is a number N of PSDs in storage virtualization system, and the N is a nature number, the control program update for the number N of PSDs in the system can simultaneously be performed without interrupting read or write requests issued from a host entity to the number N of PSDs.

43. The storage virtualization system as claimed in claim 39, wherein a linking status of the modified data segment is a linked data linked to the modified data segment, and when there occurs a failure of PSD and a total number of failed PSDs in the storage virtualization system is smaller than or equal to the number of parity PSDs, a data loss will not occur and the control program update or the partial rebuilding of the selected PSD is continuously performed until the selected PSD completes the partial building.

44. The storage virtualization system as claimed in claim 39, wherein a linking status of the modified data segment is a linked data linked to the modified data segment, and when there occurs a failure of PSD and a total number of failed PSDs in the storage virtualization system is equal to the number of parity PSDs, read or write requests that access to the PSDs are temporarily stopped until the selected PSD completes the partial building.

45. A method for updating a control program of a PSD in a storage virtualization system, comprising:
    providing a plurality of parity data chunks in the same data stripe;
    selecting at least one PSD desired to update a control program therein;
    making the selected PSD enter an off-line state; and
    updating the control program of the selected PSD, wherein if it needs to issue a write request to the selected PSD before the completion of the control program update, an unmodified data segment corresponding to the write request is marked as a modified data segment.

46. The method as claimed in claim 45, wherein if it needs to read the data out from a data segment of the selected PSD when the selected PSD is in a period of the control program update, redundant data of the data segment is used for computing the read data, and the read data is send out.

47. The method as claimed in claim 45, wherein if it needs to write data into the modified data segment of the selected PSD, when the selected PSD is in a period of the control program update, the marking of the modified data segment remains unchanged.

48. The method as claimed in claim 45, further comprises step of:
    performing a partial rebuilding on the selected PSD after completion of the control program update.

49. The method as claimed in claim 48, wherein the partial rebuilding comprises the steps of:
    (a) selecting the modified data segment, using redundant data of the modified data segment for computation to obtain new data of the modified data segment, overwriting the modified data segment by the new data, and canceling the marking of the modified data segment; and
    (b) repeating step (a) until no modified data segment is existed in the selected PSD.

50. The method as claimed in claim 48, wherein if it needs to read the data out from a modified data segment of the selected PSD when the selected PSD is in a period of the partial rebuilding, redundant data of the modified data segment is used for computing the read data, and the read data is send out.

51. The method as claimed in claim 48, wherein if it needs to write data into the modified data segment of the selected PSD when the selected PSD is in a period of the partial rebuilding, data in the modified data segment is overwritten by the write data corresponding to the modified data segment, and the marking of the modified data segment is canceled.

52. The method as claimed in claim 48, wherein if it needs to write the data into the modified data segment of the selected PSD when the selected PSD is in a period of partial rebuilding, the marking of the modified data segment remains unchange.

53. The method as claimed in claim 48, wherein when there occurs a failure of PSD and a total number of the off-line PSDs in the storage virtualization system is smaller than or equal to a number of parity PSDs, the control program update or the partial rebuilding of the selected PSD is continuously performed until the selected PSD completes the partial building.

54. The method as claimed in claim 53, wherein the storage virtualization system is configured a plurality of parity PSD therein, and if there a failure of PSD occurs, and the other PSD is performed in a period of control program update or partial rebuilding, the PSD can still continue performing the control program update or partial rebuilding, and the system will not lose data.

55. The method as claimed in claim 48, wherein when there occurs a failure of PSD and a total number of off-line PSDs in the storage virtualization system is equal to a number of parity PSDs, read or write requests that access to the PSDs are temporarily stopped until the selected PSD completes the partial building.

56. The method as claimed in claim 48, wherein when there occurs a failure of PSD and a total number of off-line PSDs in the storage virtualization system is greater than a number of parity PSDs, the data on the modified data segment of the selected PSD is marked as bad data.

57. The method as claimed in claim 48, wherein when there occurs a failure of PSD and the failed PSD is performing the control program update or the partial rebuilding, if the failed PSD has the modified data segment, the marking of the modified data segment is cancelled.

58. The method as claimed in claim 45, wherein if a data linking status of the modified data segment is a status with linked data, the data corresponding to the write request issued to the selected PSD is stored in a memory and becomes a linked data.

59. The method as claimed in claim 58, wherein if it needs to read data out from a data segment of the selected PSD when the selected PSD is in a period of the control program update, redundant data of the data segment is used for computing the read data, and the read data is send out.

60. The method as claimed in claim 58, wherein if it needs to read data out from the modified data segment of the selected PSD when the selected PSD is in a period of the control program update, the linked data of the modified data segment is directly sent out.

61. The method as claimed in claim 58, wherein if it needs to write data into the unmodified data segment of the selected PSD when the selected PSD is in a period of the control program update, the unmodified data segment is marked as the modified data segment, and the write data of the write request corresponding to the unmodified data segment is stored as the linked data.

62. The method as claimed in claim 58, wherein if it needs to write data into the a modified data segment of the selected PSD when the selected PSD is in a period of the control program update, the marking of the modified data segment remains unchanged, and the original linked data linked to the modified data segment is directly overwritten by the write data of the write request corresponding to the modified data segment.

63. The method as claimed in claim 58, further comprises step of:
    performing a partial rebuilding on the selected PSD after completion of the control program update.

64. The method as claimed in claim 63, wherein the partial rebuilding comprises the steps of:
    (a) selecting the modified data segment, duplicating the linked data of the modified data segment to the modified data segment, and canceling the marking of the modified data segment; and (b) repeating step (a) until no the modified data segment exists in the selected PSD.

65. The method as claimed in claim 63, wherein if it needs to read data out from the modified data segment of the selected PSD when the selected PSD is in a period of the partial rebuilding, the linked data linked to the modified data segment is directly sent out.

66. The method as claimed in claim 63, wherein if it needs to write data into the modified data segment of the selected PSD when the selected PSD is in a period of the partial rebuilding, data in the modified data segment is directly overwritten by the write data of the the write request corresponding to the modified data segment, and the marking of the modified data segment is cancelled.

67. The method as claimed in claim 63, wherein if it needs to write data into the data segment of the selected PSD when the selected PSD is in a period of partial rebuilding, the marking of the modified data segment remains unchanged, and a original linked data linked to the modified data segment is directly overwritten by the write data of the write request corresponding to the modified data segment.

68. The method as claimed in claim 63, wherein when there occurs a failure of PSD and a total number of the failed PSDs in the storage virtualization system is smaller than or equal to a number of parity PSDs, a data loss will not occur, and the control program update or the partial rebuilding of the selected PSD is continuously performed until the selected PSD completes the partial building.

69. The method as claimed in claim 63, wherein the storage virtualization system is configured a plurality of parity PSD therein, and if there a failure of PSD occurs, and the other PSD is performed in a period of control program update or partial rebuilding, the PSD can still continue performing the control program update or partial rebuilding and the system will not lose data.

70. The method as claimed in claim 63, wherein when there occurs a failure of PSD, a total number of the failed PSDs is equal to a number of parity PSDs, read or write requests that access to the PSD are temporarily stopped until the selected PSD completes the partial building.

71. The method as claimed in claim 63, wherein when there occurs a failure of PSD, a total number of the failed PSDs and PSDs of control program update is greater than a number of parity PSDs, if it needs to write data into the unmodified data segment of the selected PSD, the read request that access to the PSD is temporarily stopped until the selected PSD completes the control program update, then redundant data of the unmodified data segment is used by computating the read data, and the read data is send out.

72. The method as claimed in claim 63, wherein when there occurs a failure of PSD and a total number of the failed PSDs in the storage virtualization system is greater than a number of parity PSDs, the linked data linked to the modified data segment is duplicated to the modified data segment.

73. The method as claimed in claim 63, wherein when there occurs a failure of PSD and the failed PSD is performing the control program update or the partial rebuilding, if the failed PSD has the modified data segment, the marking of the modified data segment is cancelled.

74. The method as claimed in claim 45 or claim 58, wherein the storage virtualization system comprises a plurality of PSDs, a first memory device and a second memory device, wherein each of the PSDs comprises a plurality of data segments and a programmable control program, the first memory device is used for storing the marking of the modified data segment, and the second memory is used for storing a linked data linked to the marking.

75. The method as claimed in claim 74, wherein the first memory device and the second memory device are located in a memory of a redundant array of independent disks (RAID) controller.

76. The method as claimed in claim 75, wherein each of the first memory device and the second memory device is a dynamic random access memory (DRAM) or a non-volatile memory (NVRAM).

77. The method as claimed in claim 76, wherein the NVRAM is a hard disk or SSD or a DRAM to which a battery or a supercapacitor supplies power thereof.

78. The method as claimed in claim 45 or claim 58, wherein the storage virtualization system comprises a plurality of a plurality of PSDs, each of which comprises a plurality of data segments and a programmable control program.

79. The method as claimed in claim 78, wherein the size of each of the data segment in PSD is the size of a data chunk, a cache memory or a logical block.

80. The method as claimed in claim 45 or claim 58, wherein if there is a number N of PSDs in storage virtualization system, and N is a nature number, the control program update for the number N of the PSDs in the system can be simultaneously performed without interrupting read or write requests issued from a host entity to the number N of PSDs.

81. A storage virtualization controller for updating a control program of a PSD in a storage virtualization system, the storage virtualization controller comprising:
a central processing circuitry (CPC);
a host-side IO device interconnect controller used to connect the CPC and at least one host entity for receiving an IO request from the at least one host entity; and
a device-side IO device interconnect controller used to connect the CPC and a plurality of PSDs for executing IO operations of the PSDs in response to the IO request received from the at least one host entity, wherein at least one data stripes is provided in the PSD and a plurality of parity data chunks are provided in the same data stripe;
wherein the CPC updates the control program of the PSDs by the following steps, comprising:
selecting at least one PSD to be updated with a control program;
making the selected PSD enter an off-line state;
updating the control program of the selected PSD, wherein if it needs to issue a write request to the selected PSD before the completion of the control program update, an unmodified data segment corresponding to the write request is marked as a modified data segment.

82. The storage virtualization controller as claimed in claim 81, wherein when there occurs a failure of PSD and a total number of off-line PSDs in the storage virtualization system is smaller than or equal to a number of parity PSDs, the control program update or the partial rebuilding of the selected PSD is continuously performed until the selected PSD completes the partial building.

83. The storage virtualization controller as claimed in claim 81, wherein a linking status of the modified data segment is a linked data linked to the modified data segment, and when there occurs a failure of PSD and a total number of off-line PSDs in the storage virtualization system is equal to a number of parity PSDs, read or write requests that access to the PSDs are temporarily stopped until the selected PSD completes the partial building.

84. The storage virtualization controller as claimed in claim 81, wherein if there is a number N of PSDs in storage virtualization system, and the N is a nature number, the control program update for the number N of PSDs in the system can simultaneously be performed without interrupting read or write requests issued from a host entity to the number N of PSDs.

85. The storage virtualization controller as claimed in claim 81, wherein a linking status of the modified data segment is a linked data linked to the modified data segment, and when there occurs a failure of PSD and a total number of the failed PSDs in the storage virtualization system is smaller than or equal to a number of parity PSDs, a data loss will not occur and the control program update or the partial rebuilding of the selected PSD is continuously performed until the selected PSD completes the partial building.

86. The storage virtualization controller as claimed in claim 81, wherein a linking status of the modified data segment is a linked data linked to the modified data segment, and when there occurs a failure of PSD and a total number of the failed PSDs in the storage virtualization system is equal to a number of parity PSDs, read or write requests that access to the PSDs are temporarily stopped until the selected PSD completes the partial building.

87. A storage virtualization system for updating a control program of a PSD in a storage virtualization system, the storage virtualization system comprising:
a host entity for issuing an IO request;
a storage virtualization controller coupled to the host entity for executing IO operations in response to the IO request; and
a plurality of PSDs coupled to the storage virtualization controller for providing data storage space to the storage virtualization system, wherein at least one data stripes is provided in the plurality of PSDs and a plurality of parity data chunks are provided in the same data stripe;
wherein the storage virtualization controller updates the control program of the PSDs by the following steps, comprising:
selecting at least one PSD to be updated with a control program therein;
making the selected PSD to enter an off-line state;
updating the control program of the selected PSD, wherein if it needs to issue a write request to the selected PSD before the completion of the control program update, an unmodified data segment corresponding to the write request is marked as a modified data segment.

88. The storage virtualization system as claimed in claim 87, wherein when there occurs a failure of PSD and a total number of off-line PSDs in the storage virtualization system is smaller than or equal to a number of parity PSDs, the control program update or the partial rebuilding of the selected PSD is continuously performed until the selected PSD completes the partial building.

89. The storage virtualization system as claimed in claim 87, wherein when there occurs a failure of PSD and a total number of off-line PSDs in the storage virtualization system is equal to the number of parity PSDs, the read or write requests that access to the PSDs are temporarily stopped until the selected PSD completes the partial building.

90. The storage virtualization system as claimed in claim 87, wherein there is a number N of PSDs in storage virtualization system, and the N is a nature number, the control program update for the number N of PSDs in the system can simultaneously be performed without interrupting read or write requests issued from a host entity to the number N of PSDs.

91. The storage virtualization system as claimed in claim 87, wherein a linking status of the modified data segment is a linked data linked to the modified data segment, and when there occurs a failure of PSD and a total number of failed PSDs in the storage virtualization system is smaller than or equal to the number of parity PSDs, a data loss will not occur and the control program update or the partial rebuilding of the selected PSD is continuously performed until the selected PSD completes the partial building.

92. The storage virtualization system as claimed in claim 87, wherein a linking status of the modified data segment is a linked data linked to the modified data segment, and when there occurs a failure of PSD and a total number of failed PSDs in the storage virtualization system is equal to the number of parity PSDs, read or write requests that access to the PSDs are temporarily stopped until the selected PSD completes the partial building.

* * * * *